(12) United States Patent
Hurd et al.

(10) Patent No.: US 8,133,970 B2
(45) Date of Patent: Mar. 13, 2012

(54) OXIDIZED AND MALEATED DERIVATIVE COMPOSITIONS

(75) Inventors: Phillip W. Hurd, Conyers, GA (US); Roger Scott Johnson, Snellville, GA (US); John B. Hines, Atlanta, GA (US); Brett A. Neumann, Covington, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 31 days.

(21) Appl. No.: 12/363,483

(22) Filed: Jan. 30, 2009

(65) Prior Publication Data

US 2009/0194731 A1    Aug. 6, 2009

Related U.S. Application Data

(60) Provisional application No. 61/025,239, filed on Jan. 31, 2008.

(51) Int. Cl.
*C09F 1/02* (2006.01)
*C09F 1/04* (2006.01)
*C09F 7/00* (2006.01)
*C09F 7/10* (2006.01)
*C11D 15/00* (2006.01)

(52) U.S. Cl. ........ 530/211; 530/214; 530/221; 530/230; 530/231; 530/232

(58) Field of Classification Search .................. 530/211, 530/214, 221, 230, 231, 232
See application file for complete search history.

(56) References Cited

U.S. PATENT DOCUMENTS

| | | | |
|---|---|---|---|
| 2,039,243 A | 4/1936 | Krzikalla et al. | |
| 2,551,436 A * | 5/1951 | Hampton | 530/211 |
| 2,554,487 A * | 5/1951 | Breslow | 530/211 |
| 2,569,404 A | 9/1951 | Dazzi | |
| 2,569,405 A | 9/1951 | Dazzi | |
| 2,569,406 A | 9/1951 | Dazzi | |
| 2,569,407 A | 9/1951 | Dazzi | |
| 2,569,420 A | 9/1951 | Kosmin | |
| 2,598,634 A | 5/1952 | Dazzi | |
| 2,627,514 A | 2/1953 | Kirkpatrick et al. | |
| 2,628,226 A * | 2/1953 | Lawrence et al. | 549/240 |
| 2,630,418 A | 3/1953 | Dazzi | |
| 2,661,359 A | 12/1953 | Dazzi | |
| 2,756,210 A | 7/1956 | Raifsnider | |
| 2,776,277 A * | 1/1957 | Keim | 530/214 |
| 3,043,786 A | 7/1962 | White | |
| 3,106,550 A * | 10/1963 | Bitting et al. | 530/213 |
| 3,112,209 A | 11/1963 | Bradley, Jr. | |
| 3,251,791 A | 5/1966 | Goodchild | |
| 3,278,562 A | 10/1966 | Thigpen et al. | |
| 3,341,485 A | 9/1967 | Long | |
| 3,390,046 A * | 6/1968 | McDavid | 162/180 |
| 3,497,490 A * | 2/1970 | Geoghegan et al. | 530/214 |
| 3,522,279 A | 7/1970 | Thigpen et al. | |
| 3,632,822 A | 1/1972 | Conroy | |
| 3,732,263 A | 5/1973 | Berman | |
| 3,776,866 A * | 12/1973 | Nakayama | 525/324 |
| 3,855,163 A | 12/1974 | Bussell | |
| 3,919,453 A | 11/1975 | Bussell | |
| 3,929,634 A | 12/1975 | Schuller | |
| 3,931,336 A | 1/1976 | Schneider | |
| 4,111,871 A | 9/1978 | Aritomi | |
| 4,133,822 A | 1/1979 | Hasman | |
| 4,207,231 A | 6/1980 | Goodrich | |
| 4,218,351 A * | 8/1980 | Rasmussen | 528/326 |
| 4,233,162 A | 11/1980 | Carney | |
| 4,292,221 A | 9/1981 | Malatesta | |
| 4,312,631 A * | 1/1982 | Cuntze et al. | 8/583 |
| 4,317,740 A | 3/1982 | Eisenhard | |
| 4,337,193 A | 6/1982 | Szita | |
| 4,410,431 A | 10/1983 | Roe | |
| 4,415,337 A | 11/1983 | Kutta et al. | |
| 4,447,344 A | 5/1984 | Roe | |
| 4,511,366 A | 4/1985 | Burrows et al. | |
| 4,521,219 A | 6/1985 | Perilstein | |
| 4,528,107 A | 7/1985 | McCaffrey et al. | |
| 4,547,224 A | 10/1985 | Schilling | |
| 4,614,235 A | 9/1986 | Keener et al. | |
| 4,614,600 A | 9/1986 | Schilling et al. | |
| 4,618,539 A | 10/1986 | Jahnke et al. | |
| 4,658,036 A | 4/1987 | Schilling | |
| 4,751,025 A * | 6/1988 | Olechowski et al. | 530/214 |
| 4,770,766 A | 9/1988 | Keller, Jr. et al. | |
| 4,927,669 A | 5/1990 | Knox et al. | |
| 4,957,511 A | 9/1990 | Ljusberg-Wahren | |
| 5,147,528 A | 9/1992 | Bulatovic | |
| 5,182,326 A * | 1/1993 | LeBlanc et al. | 524/514 |
| 5,292,480 A | 3/1994 | Fischer et al. | |
| 5,300,569 A | 4/1994 | Drake et al. | |

(Continued)

FOREIGN PATENT DOCUMENTS

CA    2299857    9/2000

(Continued)

OTHER PUBLICATIONS

Shi et al. Polymer 42, 2001, 5549-5557.*
Kantro, D.L., Influence of Water-Reducing Admixtures on Properties of Cement Paste—A Miniature Slump Test, Cement, Concrete and Aggregates, Winter 1980, pp. 95-102, vol. 2, No. 2.
International Search Report and Written Opinion of the International Searching Authority for PCT/US2009/032701, mailed May 20, 2009, 9 pages, European Patent Office, Rijswijk, Netherlands.
Huntsman Corporation, Technical Bulletin for Jeffamine® D-230 amine Epoxy Curing Agent, one page.
Huntsman Corporation, Technical Bulletin for Jeffamine® D-400 Polyetheramine, two pages.
Huntsman Corporation, Technical Bulletin for Jeffamine® D-2000 Polyetheramine, two pages.
Georgia-Pacific Chemicals LLC, Material Safety Data Sheet for XTOL® 0530 Rosin Fortified Distilled Tall Oil, effective date Oct. 30, 1997, six pages.

(Continued)

*Primary Examiner* — Liam Heincer
(74) *Attorney, Agent, or Firm* — Michael S. Kerns

(57) ABSTRACT

Oxidized and maleated derivative compositions, such as chemically modified oxidized and maleated tall oil fatty acid compositions, can be prepared and used in a variety of industrial applications, including as emulsifiers, corrosion inhibitors, concrete admixtures, and in reverse flotation mining applications.

10 Claims, 3 Drawing Sheets

U.S. PATENT DOCUMENTS

| | | | |
|---|---|---|---|
| 5,328,505 A | 7/1994 | Schilling | |
| 5,338,347 A | 8/1994 | Rohr et al. | |
| 5,344,483 A | 9/1994 | Hinton | |
| 5,348,676 A | 9/1994 | Takashima et al. | |
| 5,379,902 A | 1/1995 | Wen et al. | |
| 5,385,616 A | 1/1995 | Dougherty et al. | |
| 5,407,471 A | 4/1995 | Rohr et al. | |
| 5,420,317 A | 5/1995 | Laufenberg et al. | |
| 5,443,158 A | 8/1995 | McKenny et al. | |
| 5,481,025 A | 1/1996 | Laufenberg et al. | |
| 5,556,451 A | 9/1996 | Minevski | |
| 5,582,792 A * | 12/1996 | Dougherty et al. | 422/16 |
| 5,643,534 A | 7/1997 | Minevski | |
| 5,658,860 A | 8/1997 | Clark et al. | |
| 5,670,056 A | 9/1997 | Yoon et al. | |
| 5,698,668 A | 12/1997 | Bender | |
| 5,704,961 A | 1/1998 | Hudson | |
| 5,759,485 A | 6/1998 | Fischer et al. | |
| 5,795,376 A | 8/1998 | Ide | |
| 5,864,049 A | 1/1999 | Dos Santos et al. | |
| 5,869,433 A | 2/1999 | Patel | |
| 5,929,408 A | 7/1999 | Gutierrez et al. | |
| 5,977,037 A * | 11/1999 | Giret et al. | 510/122 |
| 6,145,667 A | 11/2000 | Rothenberg et al. | |
| 6,149,013 A | 11/2000 | Hughes | |
| 6,153,693 A | 11/2000 | Matzinger et al. | |
| 6,170,669 B1 | 1/2001 | Senior et al. | |
| 6,200,377 B1 | 3/2001 | Basilio et al. | |
| 6,341,697 B1 | 1/2002 | Miller et al. | |
| 6,375,853 B1 | 4/2002 | Yoon | |
| 6,409,022 B1 | 6/2002 | Rothenberg et al. | |
| 6,426,321 B1 | 7/2002 | Durrieu et al. | |
| 6,469,125 B1 | 10/2002 | Fontana et al. | |
| 6,526,675 B1 | 3/2003 | Yoon | |
| 6,583,263 B2 * | 6/2003 | Gaudl | 530/232 |
| 6,589,917 B2 | 7/2003 | Patel et al. | |
| 6,620,770 B1 | 9/2003 | Kirsner et al. | |
| 6,666,268 B2 | 12/2003 | Griffith et al. | |
| 6,668,929 B2 | 12/2003 | Griffith et al. | |
| 6,774,094 B2 | 8/2004 | Jovancicevic et al. | |
| 6,793,079 B2 | 9/2004 | Khan et al. | |
| 6,799,682 B1 | 10/2004 | Yoon | |
| 6,800,594 B2 | 10/2004 | Miksic et al. | |
| 6,849,581 B1 * | 2/2005 | Thompson et al. | 507/118 |
| 6,871,743 B2 | 3/2005 | Yoon | |
| 6,988,623 B2 | 1/2006 | Magliocco et al. | |
| 7,008,907 B2 | 3/2006 | Kirsner et al. | |
| 7,137,401 B2 | 11/2006 | Jovancicevic et al. | |
| 7,479,184 B1 | 1/2009 | Dehuvyne et al. | |
| 2003/0116065 A1 | 6/2003 | Griffith et al. | |
| 2003/0130135 A1 | 7/2003 | Hou et al. | |
| 2004/0144957 A1 * | 7/2004 | Miksic et al. | 252/391 |
| 2004/0171498 A1 | 9/2004 | Miller | |
| 2005/0080178 A1 * | 4/2005 | Fujii et al. | 524/437 |
| 2005/0137093 A1 | 6/2005 | Miller | |
| 2007/0075120 A1 | 4/2007 | Yang et al. | |
| 2007/0167333 A1 | 7/2007 | Hurd et al. | |
| 2008/0179570 A1 * | 7/2008 | Hurd et al. | 252/396 |
| 2008/0194795 A1 * | 8/2008 | Hurd et al. | 530/230 |
| 2008/0272342 A1 * | 11/2008 | Guzmann et al. | 252/392 |
| 2008/0305531 A1 | 12/2008 | Lam et al. | |
| 2009/0065736 A1 * | 3/2009 | Johnson et al. | 252/88.1 |
| 2009/0194466 A1 | 8/2009 | Hines et al. | |
| 2010/0028272 A1 * | 2/2010 | Knappe et al. | 424/47 |

FOREIGN PATENT DOCUMENTS

| | | |
|---|---|---|
| DE | 10015913 | 10/2000 |
| EP | 0239770 A1 | 10/1987 |
| EP | 0711850 | 5/1996 |
| EP | 1676897 | 5/2011 |
| JP | 18020 | 9/1949 |
| JP | 30-008548 | 11/1955 |
| JP | 32-000331 | 1/1957 |
| JP | 60-018583 | 1/1985 |
| WO | 89-11516 | 11/1989 |
| WO | 00/52230 | 9/2000 |
| WO | 2004/050801 | 6/2004 |
| WO | 2007002558 A1 | 1/2007 |

OTHER PUBLICATIONS

Georgia-Pacific Chemicals LLC, Material Safety Data Sheet for LYTOR® 100 Tall Oil Resin, effective date Jan. 22, 2001, seven pages.
Georgia-Pacific Chemicals LLC, Material Safety Data Sheet for LYTOR® 101 Tall Oil Resin, effective date Jan. 22, 2001, seven pages.
Georgia-Pacific Chemicals LLC, Material Safety Data Sheet for XTOL® 0520 Distilled Tall Oil, effective Dec. 9, 2004, seven pages.
Georgia-Pacific Chemicals LLC, Material Safety Data Sheet for XTOL® MTO Modified Tall Oil, effective date May 23, 2007, seven pages.
Georgia-Pacific Chemicals LLC, Material Safety Data Sheet for XTOL® 0542 Rosin Fortified Distilled Tall Oil, effective date Oct. 9, 2007, seven pages.
Georgia-Pacific Chemicals LLC, Material Safety Data Sheet for XTOL® 692 Modified Tall Oil, effective date Oct. 30, 2007, seven pages.
Georgia-Pacific Chemicals LLC, Material Safety Data Sheet for XTOL® 690 Modified Tall Oil, effective date Jan. 23, 2008, seven pages.
Georgia-Pacific Chemicals LLC, Material Safety Data Sheet for XTOL® 304 Tall Oil Fatty Acids, effective date Apr. 4, 2008, six pages.
Georgia-Pacific Chemicals LLC, Material Safety Data Sheet for XTOL® 100 Tall Oil Fatty Acids, effective date Apr. 14, 2008, six pages.
Georgia-Pacific Chemicals LLC, Material Safety Data Sheet for XTOL® 101 Tall Oil Fatty Acids, effective date Apr. 14, 2008, six pages.
Georgia-Pacific Chemicals LLC, Material Safety Data Sheet for XTOL® 300 Tall Oil Fatty Acids, effective date Apr. 14, 2008, six pages.
SciFinder Search Results for "Maleated Tall Oil, Oxidized." Search conducted Aug. 25, 2006 yielding 4 references, p. 1-3.
SciFinder Search Results for "Oxidized Maleated Tall Oil." Search conducted Aug. 25, 2006 yielding 4 references. pp. 1-3.
Specification for Tall Oil Products-Product Information "XTOL® 690 Modified Tall Oil." 1996, 2002 Georgia-Pacific Resins, Inc.
Specification for Tall Oil Products-Product Information "Latol MTO® Oxidized Tall Oil." 1996, 2002 Georgia-Pacific Resins, Inc.
Specification for Tall Oil Products-Product Information "XTOL® 304 Tall Oil Fatty Acid." 1996, 2002, 2007 Georgia-Pacific Chemicals LLC.
Specification for Tall Oil Products-Product Information "XTOL® 100 Tall Oil Fatty Acid." 1996, 2002, 2007 Georgia-Pacific Chemicals LLC.
Specification for Tall Oil Products-Product Information "XTOL® 101 Tall Oil Fatty Acid." 1996, 2002, 2007 Georgia-Pacific Chemicals LLC.
Specification for Tall Oil Products-Product Information "XTOL® 300 Tall Oil Fatty Acid." 1996, 2002, 2007 Georgia-Pacific Chemicals LLC.
Specification for Tall Oil Products-Product Information "XTOL® 531 Distilled Tall Oil." 1996, 2002 Georgia-Pacific Reins, Inc.
Materials Safety Data Sheet "XTOL® 692 Modified Tall Oil." pp. 1-6. Effective Date May 23, 2005. Georgia-Pacific Chemicals LLC.
Izumi, et al, "Fatty Acid Derivatives and Their Utilization. IX. Synthesis and Properties of High-Molecular-Weight Aliphatic Poly(Amide-Amines),"Kogyo Kagaku Zasshi, 1969, 72(4): 1018-1022.
Eslami, "Addition Products of Maleic Anhydride with Oleic Acid and Some of Their Derivatives," J. Rech. Centre Natl. Rech. Sic., Lab Bellevue (Paris), 1962, No. 61. pp. 333-355.
Shigeno, et al, "Derivatives of Maleinated Monoolefinic Unsaturated Fatty Acids as Synthetic Lubricants and Oiliness Improver," Kogyo Kagaku Zasshi, 1957,vol. 60, pp. 582-586, vol. 60.

Shigeno, et al, "trans-Stereoisomer of Adducts of Maleic Anhydride with Olefinic Unsaturated Fatty Acids," Kogyo Kagaku Zasshi, 1957, pp. 577-582, vol. 60.

Shigeno, et al, "Derivatives of Maleinated Monooelefinic Unsaturated Fatty Acids and Their Utilization as Rust Inhibitor, Antibacterial Agent, Surface-Active Agent, and Stabilizer for Poly(Vinyl Chloride) Resin", Kogyo Kagaku Zasshi, 1957, vol. 60, pp. 720-728, vol. 60.

Volodkovich, et al, "Organic Insectofungicides. XXXV. Reaction of 1,1-difluorotetrachlorocyclopentadiene With Some Unsaturated Compounds," Zhurnal Obshchei Khimii, 1958, 28(10):3153-3156.

Novakov et al, "Synthesis and Properties of Some Epoxy Esters and Water-Borne Coatings Prepared on Their Basis", Surface Coatings International, Mar. 1993, pp. 111-115, vol. 76—No. 3, Oil and Colour Chemists' Association, Wembley, England.

PCT International Search Report and Written Opinion of the International Searching Authority for PCT/US2008/052682 mailed Dec. 10, 2008.

Filippychev, et al. "Water-Thinnable Styrene-Oil Film-Forming Agents", Khim. Khim. Tekhnol., 1973, pp. 25-27, Yarosl, Politekh. Inst., Yaroslaul, USSR.

Babkina, et al, "Alkyd Resins Made from Tall Oil and Maleic Anhydride", USSR, Deposited Document (1980), 12 pp.

Isogai, et al, Emulsion Stability and Sizing Performance of Alkyl Oleate-Succinic Anydrides, "Paper Technology", Sep. 2004, 45(7): 19-24, Pita, Lancaster, U.K.

Office Actions for U.S. Appl. No. 11/669,713.

Office Actions for U.S. Appl. No. 12/023,886.

Final Rejection for U.S. Appl. No. 12/023,886 Mailed Sep. 19, 2011.

Bickford et al. (Journal of the American Oil Chemists' Society, 1948, 254-257.

Figge, Chem. Phys. Lipids 6, 1971, 164-182.

* cited by examiner

OXIDIZED AND MALEATED DERIVATIVE COMPOSITIONS

RELATED APPLICATIONS

This application claims the benefit of priority of U.S. Provisional Patent Application No. 61/025,239, filed Jan. 31, 2008, which is hereby incorporated by reference in its entirety.

TECHNICAL FIELD

This disclosure relates to compounds, which are derivatives of oxidized and maleated compounds, and methods of making and using such compounds. This disclosure also relates to compositions, which include derivatives of oxidized and maleated compounds, and methods of making and using such compositions.

BACKGROUND

Tall oil is a mixture of mainly acidic compounds found in pine trees and obtained as a by-product of the pulp and paper industry. It is produced, for example, in the form of a resinous yellow-black oily liquid as an acidified byproduct in the Kraft or sulfate processing of pine wood. Tall oil, also known as "tallol" or "liquid resin", prior to refining, is normally a mixture of rosin acids, fatty acids, sterols, high-molecular weight alcohols, and other alkyl chain materials (i.e. rosin acids, fatty acids, and unsaponifiables or "neutral compounds"). Distillation of crude tall oil can be used to recover a mixture of fatty acids in the $C_{16-20}$ range. Commercially available tall oil products XTOL® 100, XTOL® 300, and XTOL® 304 (all from Georgia-Pacific Chemicals LLC, Atlanta, Ga.), for example, all contain saturated and unsaturated fatty acids in the $C_{16-20}$ range, as well as minor amounts of rosin acids. It should be appreciated that, as tall oil is derived from a natural source, its composition can vary. The main fatty acids found in all tall oils, however, are oleic, linoleic, stearic, and palmitic acids.

Tall oil has a variety of uses in industry. For example, it can be used as a frothing agent in the flotation process for reclaiming low grade copper-, lead-, and zinc-bearing ores, and as a solvent or wetting agent in a variety of textile and synthetic fiber manufacturing processes. The distilled fatty acids can be used in soaps, detergents, and disinfectants and as a base for lubricating greases, textile oils, cutting oils, and metal polishes. Rosin acids can be used in rubber polymerization and compounding, as size to impart water resistance to paper, and in adhesives and printing inks.

SUMMARY

This disclosure provides compositions comprising derivatized compounds, which compounds are both maleated and oxidized. In some embodiments, the derivatized compounds are derivatized dimer-type acids based on fatty acids, rosin acids, or mixtures thereof. In some embodiments, the derivatized compounds are derivatized trimer-type acids based on fatty acids, rosin acids, or mixtures thereof. In some embodiments, the fatty acids, rosin acids, or mixtures thereof are derived from tall oil, vegetable oil, animal oil, algal produced oil, microbial produced oil, or mixtures thereof.

This disclosure also provides methods of making compositions comprising derivatized maleated and oxidized compounds. In some embodiments, the compositions are made by derivatizing a source of fatty acids, rosin acids, or mixtures thereof, which has been oxidized and maleated. In some embodiments, the source of fatty acids, rosin acids, or mixtures thereof is a tall oil, a vegetable oil, an animal oil, or mixtures thereof. This disclosure also provides methods of using derivatized compounds and compositions in accordance with the invention. In some methods, compounds and compositions in accordance with some embodiments of the invention can be used as emulsifiers. In some methods, compounds and compositions in accordance with some embodiments of the invention can be used as corrosion inhibitors. In some methods, compounds and compositions in accordance with some embodiments of the invention can be used as cross-linking agents. In some methods, compounds and compositions in accordance with some embodiments of the invention can be used as concrete admixtures. In some methods, compounds and compositions in accordance with some embodiments of the invention can be used as antistrip agents for asphalt. In some methods, compounds and compositions in accordance with some embodiments of the invention can be used as collectors in reverse flotation ore mining applications.

Provided herein is a composition, comprising an oxidized and maleated compound having one or more derivatized carboxylic acid moieties. In some embodiments, the one or more derivatized carboxylic acid moieties is a carboxylic acid reacted with one or more of ricinoleic acid, a polyamine, an amino alcohol, an imidazoline, a metal chelator, an acetylenic alcohol, morpholino, a phosphate ester, an amino acid, a xanthate, a thiophosphate ester, a hydroxamic acid, a sulfonate, and a sulfate.

In certain embodiments, the polyamines are chosen from: ethylenediamine, diethylenetriamine, triethylenetetramine, tetraethylenepentamine, isophorone diamine, aminoethyl piperazine, piperazine, hydroxyethylethyene diamine, diaminobenzene, lysine, ornithine, xylylenediamine, hexamethylene diamine, bis(hexamethylene)triamine, diaminobenzene sulfonic acid, diaminopropane, diaminocyclohexane, polylysine, polyornithine, polyallylamine, Amine HH, Jeffamines, dipropylenetriamine, triproplyenetetraamine, 1,2-bis(3-aminopropylamino)ethane, bis(hexamethylene)triamine, 1,3-propanediamine, cadaverine, putrascine, spermine, spermidine, histamine, tryptamine, agmatine, cytosine, and serotonin.

In some embodiments, the amino alcohols are chosen from: monoethanolamine, aminoethylethanolamine, diethanolamine, monoisopropanolamine, and diisopropanolamine.

In other embodiments, the amino acids are chosen from natural and unnatural amino acids.

Further provided herein is an oxidized and maleated derivative composition.

Also provided herein is a product produced by the process of chemically modifying an oxidized and maleated composition.

Methods of using oxmal derivative compositions are also provided herein. In one embodiment, a method of emulsifying a solution is provided, the method comprising combining the solution with an effective amount of an oxmal derivative composition. In some embodiments, a method of inhibiting corrosion on a metal surface is provided, the method comprising contacting the metal surface with an effective amount of an oxmal derivative composition. In additional embodiments, a method of reducing corrosion on a metal surface is provided, the method comprising contacting the metal surface with an effective amount of an oxmal derivative composition. In another embodiment, a method of floating an ore is provided, the method comprising introduction of a composition comprising an ore collector to a reverse flotation cell, wherein the composition comprises an effective amount of an oxmal derivative composition. In some embodiments, a method of modifying concrete is provided, the method comprising adding a concrete admixture to the concrete, wherein the concrete admixture comprises an oxidized and maleated derivative composition.

The details of one or more non-limiting embodiments of the invention are set forth in the accompanying drawings and the description below. Other embodiments of the invention should be apparent to those of ordinary skill in the art after consideration of the present disclosure.

DETAILED DESCRIPTION

Figure 1:
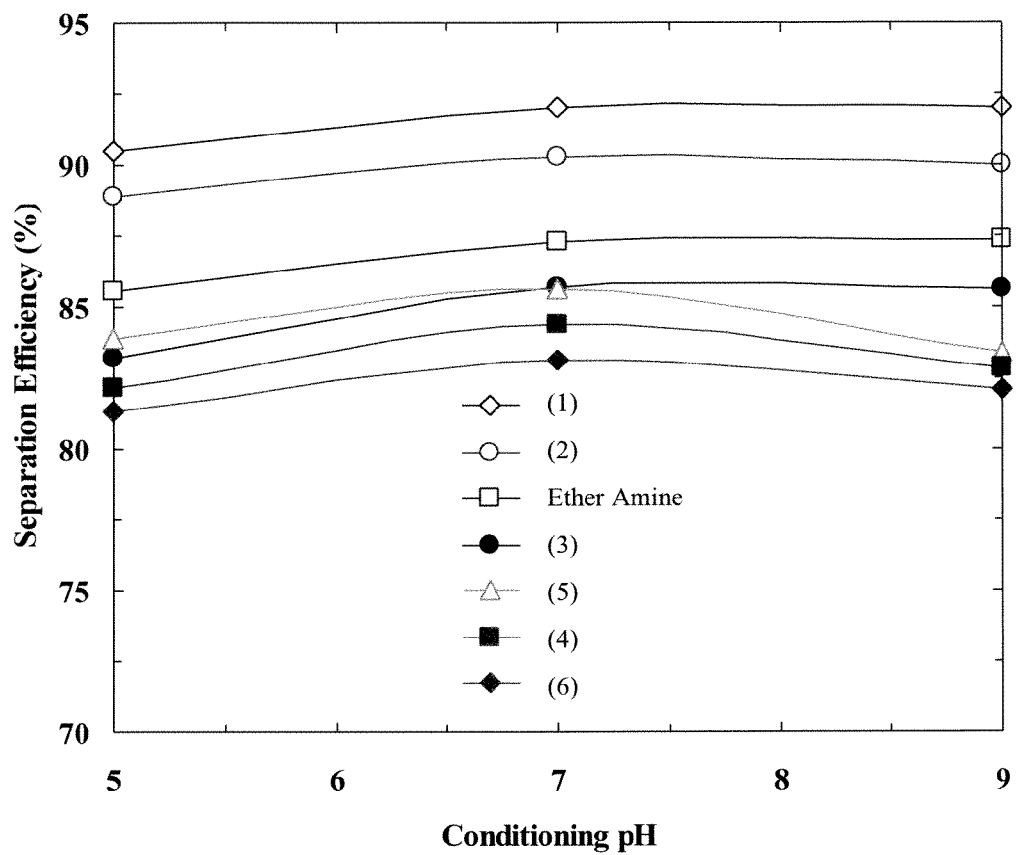
FIG. 1 details the effects of pH and collector type on reverse flotation separation efficiency at a collector dosage of 1.0 lb/ton.

Methods of making and using oxidized and maleated compounds and compositions can be found in U.S. application Ser. No. 12/023,886, entitled, "Oxidized and Maleated Compounds and Compositions", filed Jan. 31, 2008, and is herein incorporated by reference in its entirety.

I. Definitions

Unless defined otherwise, all technical and scientific terms used herein have the same meaning as is commonly understood by one of ordinary skill in the art to which this disclosure belongs. All patents, applications, published applications, and other publications are incorporated by reference in their entirety. In the event that there is a plurality of definitions for a term herein, those in this section prevail unless stated otherwise.

An "oxidized and maleated compound" (hereinafter an "oxmal compound") is a compound, or salt thereof, comprising at least two or more hydrocarbon-based backbone structures, wherein at least one of the backbone structures is substituted by at least one of an $\alpha,\beta$ unsaturated carboxylic acid or anhydride, and further wherein each backbone structure is linked to one other backbone structure by a bridging group chosen from a direct bond, an ether linkage, or a peroxide linkage located at a non-terminal position of each backbone structure. In some embodiments, the hydrocarbon-based backbone structure is a $C_{10}$-$C_{24}$ hydrocarbon. In some embodiments, the hydrocarbon-based backbone is a $C_{10}$-$C_{24}$ fatty acid or rosin acid. In some embodiments, the $\alpha,\beta$ unsaturated carboxylic acid or anhydride is maleic anhydride, fumaric acid, acrylic acid, or methacrylic acid (herein acrylic acid and methacrylic acid are generally referred to in the aggregate or alternative as (meth)acrylic acid). In some embodiments, the $\alpha,\beta$ unsaturated carboxylic acid or anhydride is a biogenically derived unsaturated carboxylic acid or anhydride. Non-limiting examples of oxmal compounds include dimers and trimers of fatty acids, rosin acids and mixtures thereof, linked at an intermediary position along the fatty acid or rosin acid backbone by a direct bond, an ether linkage, or a peroxide linkage, and wherein each of the fatty acids and rosin acids is substituted by a maleic anhydride, fumaric acid, or (meth)acrylic acid.

An "oxidized and maleated composition" (hereinafter an "oxmal composition") is a composition comprising one or more oxmal compounds, wherein when the composition comprises more than one oxmal compound, the oxmal compounds can be the same or different. Non-limiting examples of oxmal compositions include tall oils, which have been maleated and oxidized; animal oils, which have been maleated and oxidized; plant oils, which have been maleated and oxidized; algal derived oils, which have been maleated and oxidized; and microbially derived oils, which have been maleated and oxidized. In some embodiments, oxmal compositions can also include one or more non-reacted or partially reacted species, such as non-maleated dimers, trimers, etc of fatty acids, rosin acids, and mixtures thereof.

The phrase "a compound, which has been maleated and oxidized" is used interchangeably with "a maleated and oxidized compound". The phrase "a composition, which has been maleated and oxidized" is used interchangeably with "a maleated and oxidized composition." The phrase "oxidized and maleated" is used interchangeably with "maleated and oxidized."

The phrase "a chemically modified oxidized and maleated composition" is used interchangeably with "an oxidized and maleated derivative composition." The phrase "a chemically modified oxidized and maleated compound" is used interchangeably with "an oxidized and maleated derivative compound." The phrase "a chemically modified oxmal composition" is used interchangeably with "an oxmal derivative composition." The phrase, "a chemically modified oxmal compound" is used interchangeably with "an oxmal derivative compound."

Wherever the phrase "for example", "such as" and the like are used herein, the phrase "and without limitation" is understood to follow unless explicitly stated otherwise. Therefore, "for example tall oil" means "for example and without limitation tall oil". Similarly all examples herein are non-limiting unless explicitly stated otherwise.

As used herein, the terms "maleated," "maleation," and the like refer to the modification of hydrocarbon-based backbone structures having one or more sites of unsaturation (e.g., $C_{18}$-fatty acids, such as linoleic acid and oleic acid), which introduces additional carboxylic moieties onto the molecules by reaction with one or more $\alpha,\beta$ unsaturated carboxylic acids or anhydrides. In some embodiments, an $\alpha,\beta$ unsaturated carboxylic acid or anhydride is chosen from maleic anhydride, fumaric acid, acrylic acid, and methacrylic acid (herein acrylic acid and methacrylic acid are generally referred to in the aggregate or alternative as (meth)acrylic acid). In some embodiments, an $\alpha,\beta$ unsaturated carboxylic acid or anhydride is a biogenically derived unsaturated carboxylic acid or anhydride.

As used herein, "acid functionality" in addition to its traditional meaning, also encompasses groups which are hydrolyzable such as anhydride groups.

As used herein, the terms "carboxylic moiety" and "carboxylic moieties" are also intended to include the anhydride structure formed by the condensation reaction between two carboxyl groups.

As used herein, "tall oil fatty acid" or "TOFA", consistent with industry standards, encompasses compositions which include not only fatty acids, but also rosin acids and/or unsaponifiables. TOFAs are generally produced as a distillation fraction of crude tall oil and therefore contain a mixture of saturated and unsaturated fatty acids, rosin acids, and mixtures thereof.

As used herein, "non-fatty acid carboxyl moiety" refers to the carboxyl moieties resulting from maleation.

As used herein, "alkyl," "alkenyl" and "alkynyl" carbon chains, if not specified, should be broadly interpreted, for example to encompass substituted or unsubstituted, straight, branched, and cyclic "chains."

As used herein, "polyolefin oligomers" in addition to its traditional meaning, also encompasses oligomers having one site of unsaturation.

As used herein, "about" is meant to account for variations due to experimental error.

II. Oxmal Compounds and Compositions

The present disclosure relates to derivatives of oxmal compositions (i.e., chemically modified), and derivatives of oxmal compounds (i.e., chemically modified).

Oxmal compounds provided herein comprise at least two or more hydrocarbon-based backbone structures, wherein at least one backbone structure is substituted by at least one $\alpha,\beta$ unsaturated carboxylic acid or anhydride, and further wherein each backbone structure is linked to one other backbone structure by a bridging group chosen from a direct bond, an ether linkage, or a peroxide linkage located at a non-terminal position of each backbone structure.

The hydrocarbon backbone structure can be chosen from, for example, substituted and unsubstituted straight-chain, branched-chain and polycyclic hydrocarbons. The hydrocarbon backbone structure can be chosen, for example, from fatty acids and rosin acids. The hydrocarbon backbone structure can be chosen from, for example, $C_{10}$-$C_{22}$ fatty acids. The hydrocarbon backbone structure can be chosen from, for example, $C_{16}$-$C_{22}$ fatty acids. The hydrocarbon backbone structure can be chosen from, for example, $C_{16}$-$C_{18}$ fatty acids. The hydrocarbon backbone structure can be, for example, a $C_{18}$ fatty acid. The hydrocarbon backbone structure can be chosen from, for example, oleic, linoleic, and linolenic acid.

In some embodiments, the hydrocarbon-backbone structure is chosen from polyolefin oligomers having at least one reactive allylic site. In some embodiments, polyolefin oligomers have at least one site of unsaturation. In some embodiments, polyolefin oligomers have at least two sites of unsaturation. In some embodiments, polyolefin oligomers have at least three sites of unsaturation. In some embodiments, the polyolefin oligomers have from 10 to 24 carbons and at least one site of unsaturation. In some embodiments, polyolefin oligomers have from 10 to 24 carbons and from one to five sites of unsaturation. In some embodiments, polyolefin oligomers have from 10 to 24 carbons and from one to three sites of unsaturation. In some embodiments, the polyolefin oligomers have from 16-18 carbons and from one to three sites of unsaturation. In some embodiments, the polyolefin oligomers have 16 or 18 carbons and two sites of unsaturation. In some embodiments, the hydrocarbon-backbone structure can be chosen from non-natural fatty acids, for example fatty acids having odd chain lengths, or 14 carbon chain lengths. In some embodiments, the hydrocarbon-backbone structures chosen from non-natural fatty acids comprise from 1 to 3 sites of unsaturation, for example 2, or for example 3 sites of unsaturation.

In some embodiments, the $\alpha,\beta$ unsaturated carboxylic acid or anhydride can be a biogenically derived $\alpha,\beta$ unsaturated carboxylic acid or anhydride. Non-limiting examples of biogenically derived $\alpha,\beta$ unsaturated carboxylic acids or anhydrides include itaconic acid, itaconic anhydride, aconitic acid, aconitic anhydride, acrylic acid, methacrylic acid, citraconic acid, citraconic anhydride, mesaconic acid, muconic acid, glutaconic acid, methylglutaconic acid, traumatic acid, and fumaric acid. The acids and anhydrides include any isomers (e.g., enantiomers, diastereomers, and cis-/trans-isomers), and salts. In some embodiments, the $\alpha,\beta$ unsaturated carboxylic acid or anhydride can be maleic anhydride, fumaric acid, or (meth)acrylic acid.

In certain embodiments all of the hydrocarbon-based backbone structures of an oxmal compound are maleated. In other embodiments, only some, for example, only one of the hydrocarbon-based backbone structures of an oxmal compound are maleated. In some embodiments, two of the hydrocarbon-based backbone structures of an oxmal compound are maleated. In some embodiments, at least one of the hydrocarbon-based backbone structures of an oxmal compound is maleated.

In some embodiments, the oxmal compounds have two or three hydrocarbon-based backbone structures, and each of the hydrocarbon-based backbone structures is of the same type. For example, without limitation, each of the two or three hydrocarbon-based backbone structures can be a fatty acid. In some embodiments, the oxmal compounds comprise two or three hydrocarbon-based backbone structures, wherein each of the hydrocarbon-based backbone structures is the same. Formulas 3-5, 9-11, 15-17, 24, and 25 below are examples of oxmal compounds having backbone structures chosen from the same fatty acid. Non-limiting examples of oxidized and maleated fatty acids having two hydrocarbon-based backbone structures that are the same include: oxidized and maleated decenoic acid; oxidized and maleated dodecenoic acid; oxidized and maleated cis-9-tetradecenoic acid; oxidized and maleated cis-9-hexadecenoic acid; oxidized and maleated oleic acid; oxidized and maleated linoleic acid; oxidized and maleated linolenic acid; oxidized and maleated cis-6,cis-9,cis-12,cis-15-octadecatetraenoic acid; oxidized and maleated ricinoleic acid; oxidized and maleated cis-9-eicosenoic acid; oxidized and maleated cis-11-eicosenoic acid; oxidized and maleated eicosadienoic acid; oxidized and maleated eicosatrienoic acid; oxidized and maleated arachidonic acid; oxidized and maleated eicosapentaenoic acid; oxidized and maleated erucic acid; oxidized and maleated docosadienoic acid; oxidized and maleated 4,8,12,15,19-docosapentaenoic acid; oxidized and maleated docosahexaenoic acid; and oxidized and maleated tetracosenoic acid.

In some embodiments, the oxmal compounds have two different hydrocarbon-based backbone structures. For example, without limitation, one of the hydrocarbon-based structures can be chosen from fatty acids and one can be chosen from rosin acids. Formulas 6-8, 12-14, and 18-20 below are examples of oxmal compounds having one rosin acid hydrocarbon-based backbone structure and one fatty acid hydrocarbon-based backbone structure. As another non-limiting example, the hydrocarbon backbone-structures can be two different fatty acids. For example, without limitation, one of the hydrocarbon-based backbone structures can be oleic acid and one of the hydrocarbon-based backbone structures can be linoleic acid.

Non-limiting specific structure examples of oxmal compounds are illustrated as Formulas 3-27 below. These examples illustrate one of the isomeric forms; however other isomers (e.g., cis and trans isomers) can be prepared.

(III)
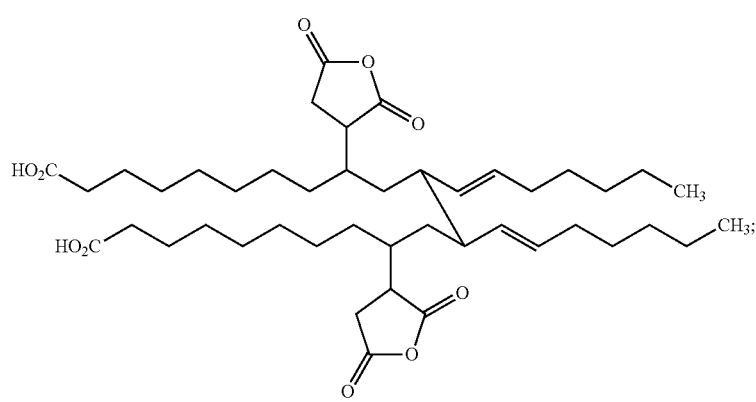
(IV)
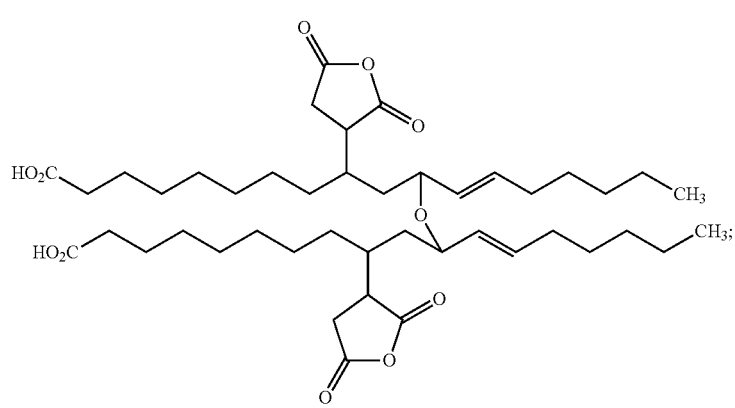
(V)
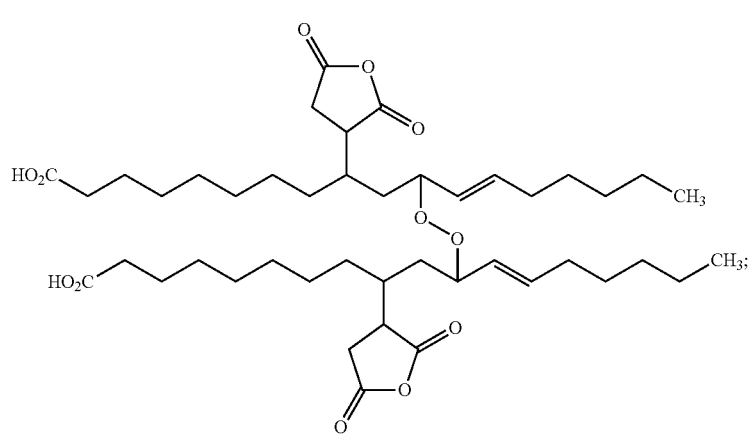
(VI)
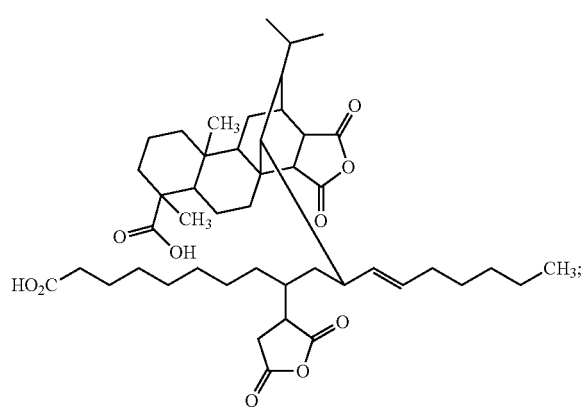
(VII)
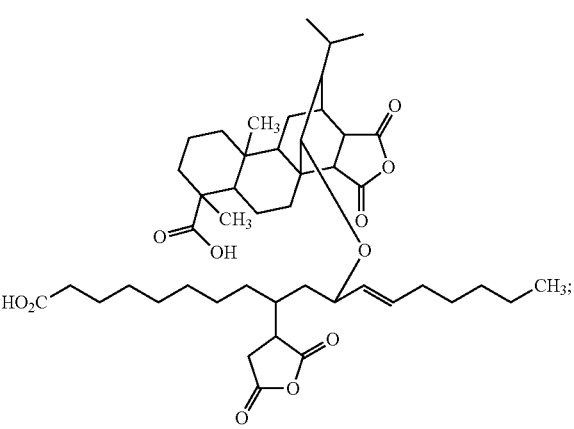

-continued
(VIII)
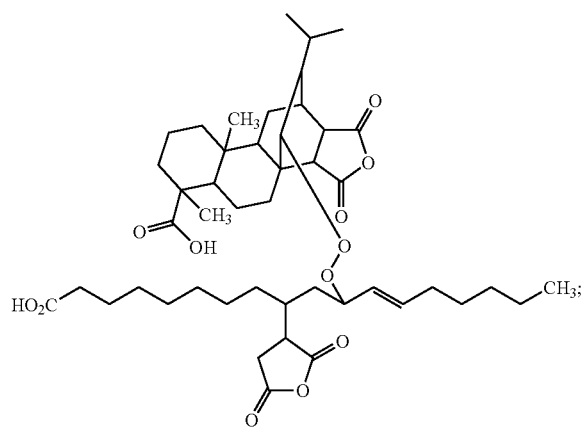
(IX)
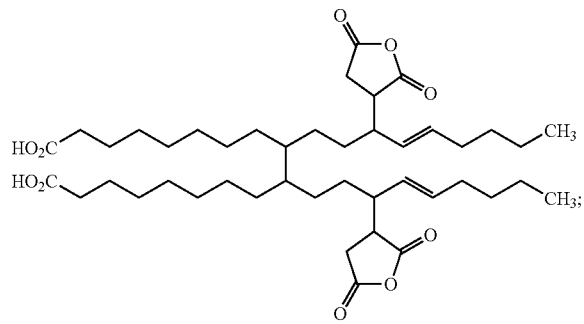
(X)
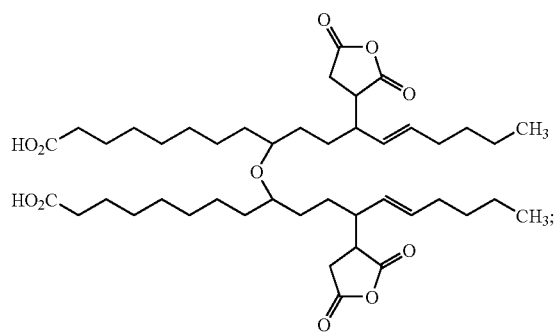
(XI)
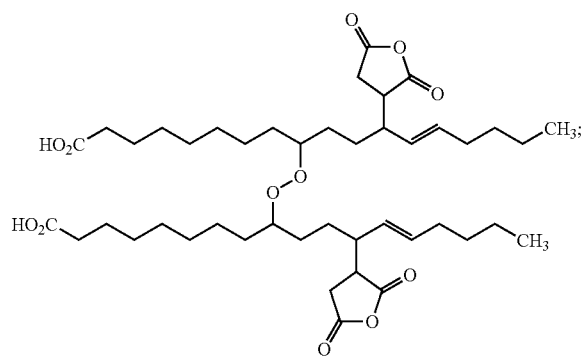
(XII)
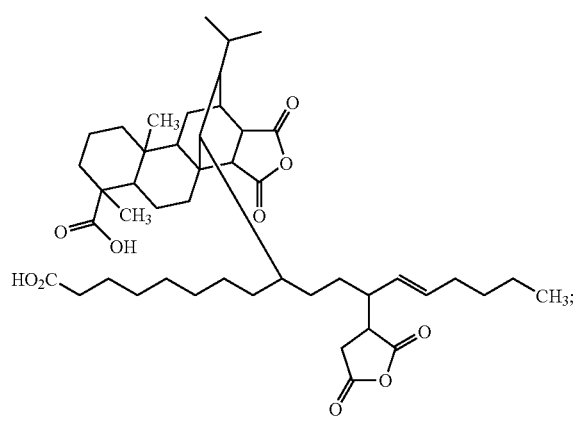
(XIII)
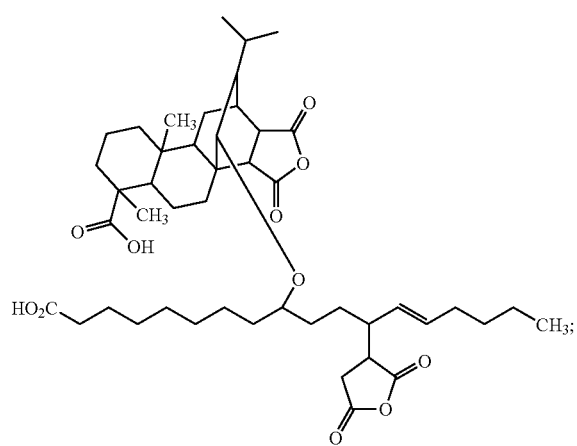

-continued
(XIV)
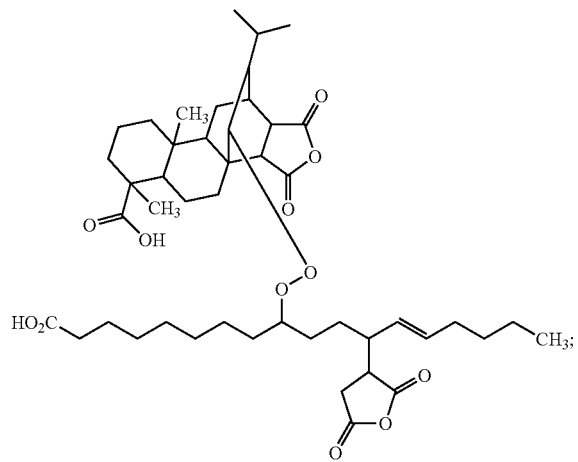
(XV)
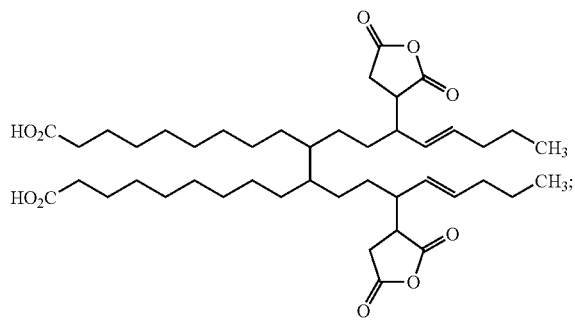
(XVI)
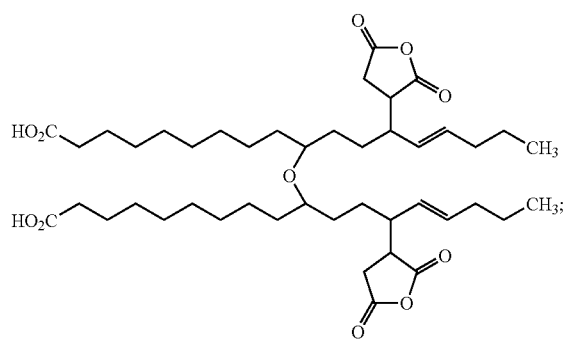
(XVII)
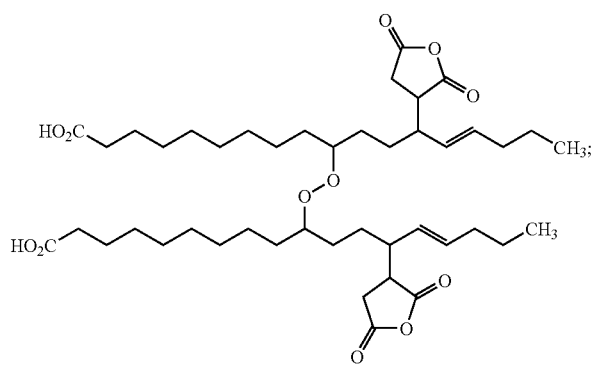
(XVIII)
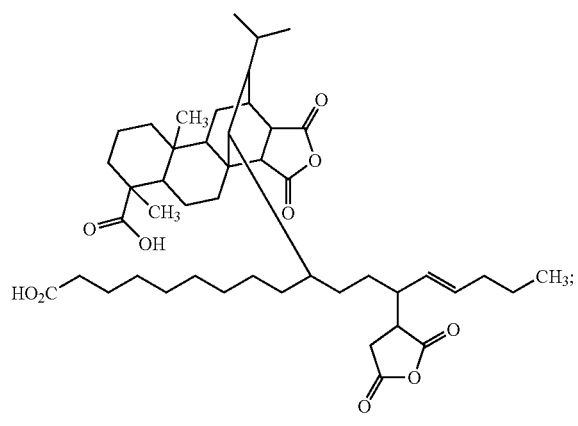
(XIX)
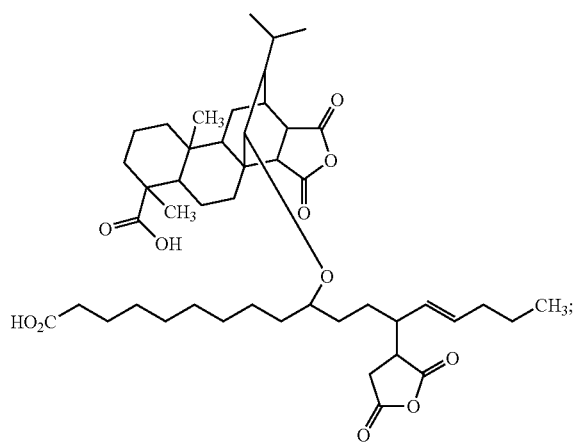

-continued
(XX)
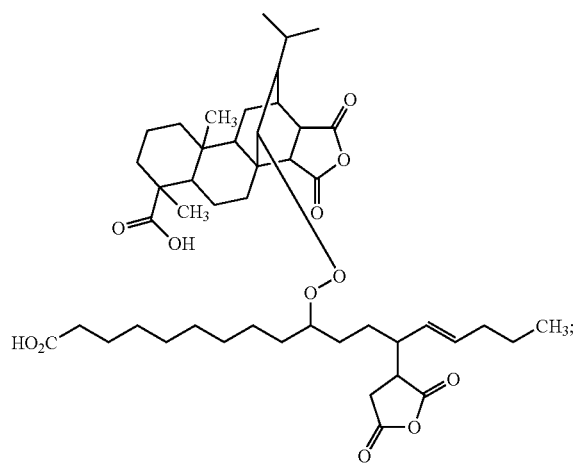
(XXI)
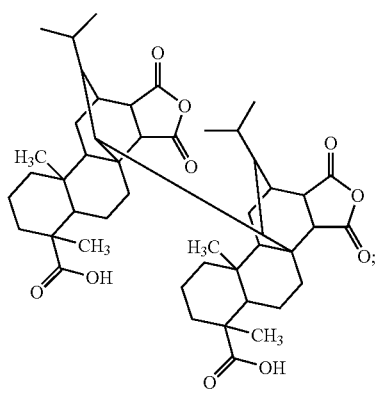
(XXII)
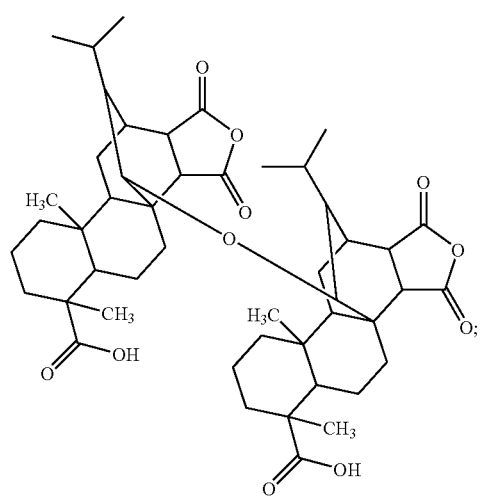
(XXIII)
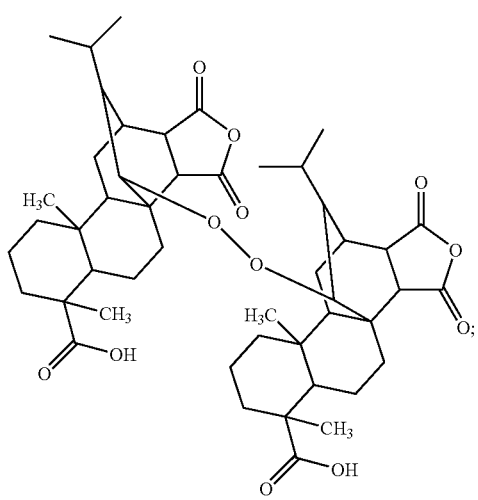
(XXIII)
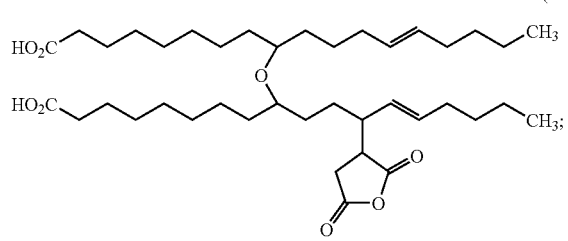
(XXV)
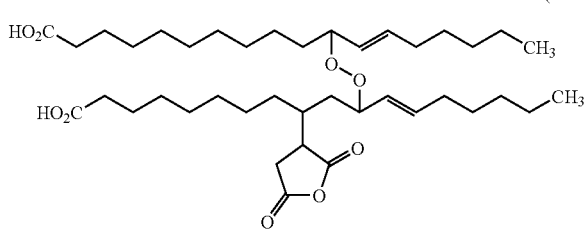
(XXVI)
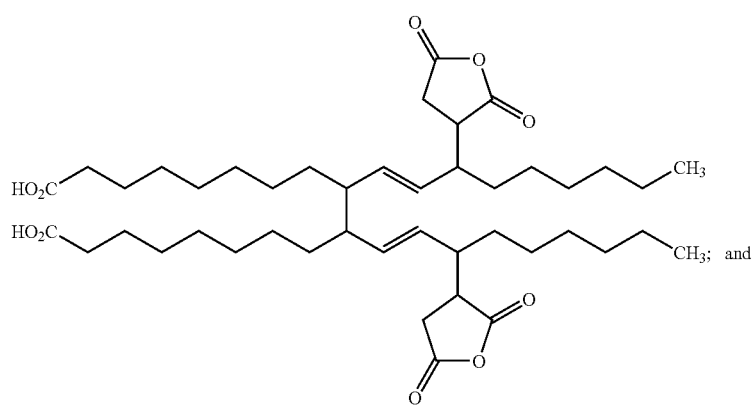
and

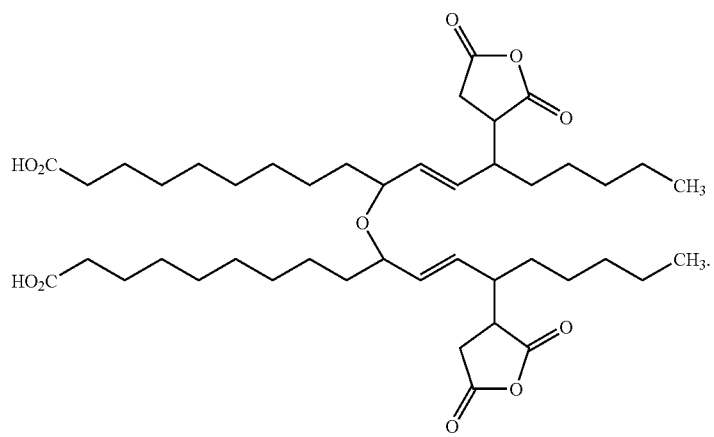

(XXVII)

Oxmal compositions provided herein comprise one or more oxmal compounds, wherein when the composition comprises more than one oxmal compound, the oxmal compounds can be the same or different. Non-limiting examples of oxmal compositions, are compositions comprising one or more of the oxmal compounds disclosed above, such as compositions containing one or more of oxidized and maleated decenoic acid; oxidized and maleated dodecenoic acid; oxidized and maleated cis-9-tetradecenoic acid; oxidized and maleated cis-9-hexadecenoic acid; oxidized and maleated oleic acid; oxidized and maleated linoleic acid; oxidized and maleated linolenic acid; oxidized and maleated cis-6,cis-9, cis-12,cis-15-octadecatetraenoic acid; oxidized and maleated ricinoleic acid; oxidized and maleated cis-9-eicosenoic acid; oxidized and maleated cis-11-eicosenoic acid; oxidized and maleated eicosadienoic acid; oxidized and maleated eicosatrienoic acid; oxidized and maleated arachidonic acid; oxidized and maleated eicosapentaenoic acid; oxidized and maleated erucic acid; oxidized and maleated docosadienoic acid; oxidized and maleated 4,8,12,15,19-docosapentaenoic acid; oxidized and maleated docosahexaenoic acid; and oxidized and maleated tetracosenoic acid. In some embodiments, an oxmal composition comprises one or more of oxidized and maleated oleic acid; oxidized and maleated linoleic acid; oxidized and maleated linolenic acid; oxidized and maleated cis-9-eicosenoic acid; and oxidized and maleated cis-11-eicosenoic acid. In another embodiment, the composition has one or more of oxidized and maleated oleic acid; oxidized and maleated linoleic acid; and oxidized and maleated linolenic acid. In a further embodiment, the composition includes oxidized and maleated oleic acid. In a further embodiment, the composition includes one or more compounds of Formula 3-27.

In some embodiments, the oxmal compositions are a source of fatty acids, rosin acids, and mixtures of fatty acids and rosin acids that have been oxidized and/or maleated. Sources of fatty acids, rosin acids, and mixtures thereof, can be, for example, any natural or synthetic oil, including algal produced and microbial produced oil, that includes at least one site of unsaturation. In certain cases, the distillation products or distillation residues of such oils can serve as the source of fatty acids, rosin acids, and mixtures thereof (e.g. distilled tall oil and tall oil distillation bottoms). In some embodiments, the natural or synthetic oil includes one site of unsaturation, two sites of unsaturation, or more. In some embodiments, the natural or synthetic oil includes at least one site of unsaturation. In some embodiments, the natural or synthetic oil comprises from 10 to 24 carbons and at least one site of unsaturation. In some embodiments, the natural or synthetic oil comprises from 16 to 22 carbons and from one to five sites of unsaturation. In some embodiments, the natural or synthetic oil comprises from 16 to 22 carbons and from one to three sites of unsaturation. In some embodiments, the natural or synthetic oil comprises 18 carbons and two sites of unsaturation. In other embodiments, these oils can contain a fatty acid having 14 carbons and three sites of unsaturation. In some embodiments, these oils can contain as one significant constituent, linoleic acid, an unsaturated long chain fatty acid, and may also contain other unsaturated fatty acids and rosin acids. In another embodiment, these oils can contain as one significant constituent, oleic acid.

Natural sources of fatty acids, rosin acids, and mixtures thereof, include plant- or animal-based oil compositions. For example, plant- and animal-based oils having double bonds, i.e., sites of unsaturation in their hydrocarbon chains can be oxidized and maleated to produce oxmal compositions according to the invention. Depending on the level of maleation, the compositions may also include unreacted or partially reacted species such as free fatty acid and rosin acid, maleated but not oxidized fatty acid and rosin acid, oxidized but not maleated fatty acid and rosin acid, and oxidized and partially maleated fatty acid and rosin acid. Non-limiting examples of plant- and animal-based oils include: canola oil; castor oil; coco butter; coconut oil; corn oil; cotton seed oil; crambe oil; linseed oil; olive oil; palm kernel oil; palm oil; peanut oil; rape seed oil; safflower oil; soybean oil; sunflower seed oil; tall oil; tung oil; butter; lard; tallow; yellow grease; and fish oil (e.g., herring oil, menhaden oil, and sardine oil). Oils can be oxidized and/or maleated directly, or if present in a combined form such as triglycerides, can be saponified to their component fatty acids before the oxidation and/or maleation reactions.

In certain embodiments, the source of fatty acids, rosin acids, and/or mixtures thereof is a plant- or animal-based oil chosen from fish oil, corn oil, soybean oil, and tall oil.

In certain embodiments, the source of fatty acids, rosin acids, and/or mixtures thereof is a plant- or animal-based oil chosen from tall oils and tall oil products. In some embodiments, tall oil products are maleated tall oil products. In some embodiments, the tall oil products are oxidized tall oil products. More generally, non-limiting examples of tall oil sources of fatty acids, rosin acids, and mixtures thereof include various tall oil products such as without limitation a tall oil itself, crude tall oil, distilled tall oil products, tall oil fatty acid (TOFA), TOFA which has been maleated in a range of from about 6% to about 25%, rosin acids, tall oil distillation bottoms, and specialty tall oil products such as those provided by Georgia-Pacific Chemicals LLC, Atlanta, Ga. For example, tall oil distillation products having greater than about 90% tall oil fatty acid and less than about 6% rosin acid, such as XTOL® 100, XTOL® 101, XTOL® 300, and XTOL® 304; tall oil distillation products such as XTOL® 520, XTOL® 530 and XTOL® 542; tall oil distillation products having at least about 90% rosin acid and less than about 5% tall oil fatty acid, such as LYTOR® 100 and LYTOR® 101; tall oil blends of tall oil fatty acid distillation bottoms and a distilled tall oil, which blend has been maleated, such as XTOL® 690, XTOL® 692; oxidized crude tall oil compositions, such as XTOL® MTO; and blends thereof.

Sources of fatty acids, rosin acids, and mixtures thereof can include various amounts of the fatty acids, rosin acids, and mixtures thereof, including various amounts of different fatty acids and rosin acids. For example, TOFA can contain oleic acid, linoleic acid, and linolenic acid, as well as rosin acids, such as abietic and pimaric acid. In some cases, the compositions may further include unsaponifiables or neutral compounds, such as hydrocarbons, higher alcohols, and sterols.

In certain embodiments, a blend of tall oil fatty acid and rosin acid can be used as the source of fatty acids and rosin acids (i.e. the source of hydrocarbon-based backbone structures) to be oxidized and maleated. Such a blend can contain, for example, from about 20% to 99% tall oil fatty acid (e.g., 20%, 25%, 30%, 45%, 50%, 60%, 75%, 82%, 90%, and 99%) and about 1% to about 55% rosin acid (e.g., 1%, 2.5%, 5%, 10%, 15%, 20%, 25%, 30%, 40%, 50%, and 55%). In some embodiments a blend can contain about 45% to about 90% tall oil fatty acid. In some embodiments a blend can contain about 30% tall oil fatty acid and about 30% rosin acid. In another embodiment, the ratio of tall oil fatty acid to rosin acid can be from about 3:2 to about 4:1 (e.g., 3:2, 4:2, 3:1, and 4:1).

As one non-limiting example, the oxmal composition can be a crude tall oil composition that has been oxidized and maleated (see Example 3). As another non-limiting example, the oxmal composition can be a tall oil fatty acid (TOFA) composition that has been oxidized and maleated (see Example 4).

In some embodiments, the oxmal compositions are a source of maleated tall oil product that has been oxidized. As one non-limiting example, the oxmal composition is a XTOL® 690 that has been oxidized (see Example 1). As another non-limiting example, the oxmal composition is a XTOL® 692 that has been oxidized (see Example 1).

In some embodiments, the oxmal composition is a source of oxidized tall oil product that has been maleated. As one non-limiting example, the oxmal composition is a XTOL® MTO that has been maleated (see Example 2).

In another embodiment, an oxmal composition can include an acid compound having at least a first backbone and a second backbone linked by a linking group. The linking group can be a direct bond, an ether linkage, or a peroxide linkage. In some embodiments, the first and second backbone can be independently chosen from a maleated unsaturated fatty acid or maleated rosin acid. In some embodiments, the first backbone is chosen from a maleated unsaturated fatty acid or maleated rosin acid and the second backbone is chosen from an unsaturated fatty acid or rosin acid.

Non-limiting examples of maleated unsaturated fatty acids can include: maleated decenoic acid; maleated dodecenoic acid; maleated cis-9-tetradecenoic acid; maleated cis-9-hexadecenoic acid; maleated oleic acid; maleated linoleic acid; maleated linolenic acid; maleated cis-6,cis-9,cis-12,cis-15-octadecatetraenoic acid; maleated ricinoleic acid; maleated cis-9-eicosenoic acid; maleated cis-11-eicosenoic acid; maleated eicosadienoic acid; maleated eicosatrienoic acid; maleated arachidonic acid; maleated eicosapentaenoic acid; maleated erucic acid; maleated docosadienoic acid; maleated 4,8,12,15,19-docosapentaenoic acid; maleated docosahexaenoic acid; and maleated tetracosenoic acid.

In certain embodiments, the maleated unsaturated fatty acid is maleated oleic acid; maleated linoleic acid; maleated linolenic acid; maleated cis-9-eicosenoic acid; or maleated cis-11-eicosenoic acid. In another embodiment, the maleated unsaturated fatty acid is maleated oleic acid; maleated linoleic acid; and maleated linolenic acid. In a further embodiment, the maleated unsaturated fatty acid is maleated oleic acid.

In certain embodiments, an oxmal composition can include compounds having at least three acid functionalities (e.g., three, four, five, six, seven, eight, nine, ten, eleven, or twelve acid functionalities). In some embodiments, an oxmal composition can include compounds having at least six acid functionalities.

In certain embodiments, the oxmal composition can be maleated from about 2% to about 40% by weight (e.g., 2%, 3.5%, 5%, 6%, 7.5%, 8%, 10%, 12%, and 15%). In some embodiments, the percent maleation is from about 2% to about 25% by weight. In one embodiment, the percent maleation is 3.5% by weight, while in another embodiment, the percent maleation is 12% by weight. In some embodiments, the percent maleation is 5% by weight. In some embodiments, the percent maleation is 6% by weight. The composition of products prepared is related to the percent maleation performed. Accordingly, in some oxmal compositions, oxmal compounds may include compounds that have been maleated, for example, on at least one hydrocarbon-based backbone structure, at least two hydrocarbon-based backbone structures, on all hydrocarbon-based backbone structures. In certain embodiments, an oxmal composition may further comprise compounds that have been oxidized but have not been maleated.

In some embodiments, an oxmal compound is prepared by oxidizing and maleating a hydrocarbon-based backbone structure having at least one site of unsaturation and at least one reactive allylic site. The hydrocarbon-backbone based structure can be, for example, a fatty acid, a rosin acid, or a polyolefin oligomer with at least one reactive allylic site. In some embodiments, the hydrocarbon-backbone structure is a $C_{16}$ or $C_{18}$ fatty acid, such as for example oleic acid, linoleic acid, and linolenic acid. In some embodiments, the backbone structure is first oxidized and than maleated. In some embodiments, the backbone structure is first maleated and then oxidized.

In some embodiments, an oxmal composition is prepared by the process of: (a) maleating a composition comprising one or more hydrocarbon-based backbone structures having at least one site of unsaturation; and (b) oxidizing the composition. In some embodiments, step (a) is performed before step (b), while in other embodiments, step (b) is performed before step (a). In some embodiments, the composition can comprise (i.e. the hydrocarbon-based backbone structures are) fatty acids, rosin acids, distillation products thereof, or mixtures thereof. In some embodiments, the compositions are chosen from tall oil, animal oils, plant oils, algal produced oils, microbial produced oils, distillation products thereof, and mixtures thereof. A person of ordinary skill will appreciate that certain of these oils or products thereof may have to be saponified prior to oxidation and maleation to obtain an appropriate backbone structure, or a fatty acid.

In the preparation of an oxmal composition, as with the preparation of an oxmal compound, the oxidation and the maleation of the hydrocarbon-backbone structures of the composition can be conducted in either order. For example, a fatty acid composition can first be maleated and then the maleation can be followed by an oxidation (see Example 3 and 4). Alternatively, the fatty acid composition can first be oxidized and then the oxidized composition can be maleated (see Example 1).

In some embodiments, the process of making an oxmal composition comprises oxidizing a commercially available maleated fatty acid composition, such as without limitation XTOL® 690 or XTOL® 692. In some embodiments, the process of making an oxmal composition comprises maleating a commercially available oxidized tall oil composition, such as without limitation XTOL® MTO.

As is known by those of skill in the art, unsaturated hydrocarbon-based structures can be polymerized by heating them in the presence of oxygen or air. This polymerization typically causes an increase in the viscosity of the oxmal composition. A catalyst can be used to increase the speed of the oxidation reaction in order to reduce the time required to attain the desired level of oxidation and associated viscosity increase, or to reduce the temperature at which the oxidation is conducted. Use of such a catalyst is optional. In some embodiments, a hydrocarbon-based structure can be a fatty acid, rosin acid, or mixtures thereof.

In some embodiments, oxidation is accomplished by heating the compositions containing the hydrocarbon-backbone based structures, such as for example tall oils, in the presence of oxygen or air. Unsaturated hydrocarbon-based structures can be polymerized by heating them in the presence of oxygen or air. This polymerization can cause an increase in the viscosity of the oxmal composition. A catalyst can be used to increase the speed of the oxidation reaction in order to reduce the time required to attain the desired level of oxidation and associated viscosity increase, or to reduce the temperature at which the oxidation is conducted. Use of such a catalyst is optional. In some embodiments, a hydrocarbon-based structure can be a fatty acid, rosin acid, or mixtures thereof. Without being bound by theory, the oxidative heating treatment is believed to cause crosslinking of the hydrocarbon chains acid via their double bonds (sites of unsaturation) and allylic sites, via a direct bond, an ether linkage, or a peroxide linkage. The oxidation treatment is continued until a desired result is obtained, for example, a desired acid value or a desired viscosity.

In some embodiments, the oxidation step in the process of producing an oxmal composition involves oxidizing a tall oil composition by heating the tall oil material to a temperature at least about 150° C., for example to a temperature in the range of about 160° C. to about 170° C., followed by sparging oxygen or air through the heated tall oil composition. As understood by those skilled in the art, a variety of techniques and devices can advantageously be used to inject the oxygen or air into the heated tall oil and the present method is not limited to any specific technique or equipment. As discussed above, the oxidation reaction can be continued until the desired acid value or viscosity is achieved in the tall oil, indicative that the desired level of cross-linking has been obtained in the oxidized tall oil material.

In some embodiments, the maleation step in the process of producing an oxmal composition involves reaction of the hydrocarbon-based structures in the composition with one or more α,β unsaturated carboxylic acids or anhydrides. The amount of α,β unsaturated carboxylic acid or anhydride used varies based on the composition to be maleated. Suitable amounts of the anhydride (or acid(s)) may range from about 2% to about 40% by weight, based on the combined weight of the composition and the anhydride (or acid(s)) and/or the desired amount of maleation. In some embodiments, the amount of anhydride (or acid(s)) can range from about 2% to about 25% by weight, usually from about 2% to about 15% by weight, based on the combined weight of the composition and the anhydride (or acid(s)) and/or the desired amount of maleation. In some embodiments, the α,β unsaturated carboxylic acid or anhydride is chosen from maleic anhydride, fumaric acid, or (meth)acrylic acid. In some embodiments, the α,β unsaturated carboxylic acid or anhydride is a biogenically derived unsaturated carboxylic acid or anhydride. The composition of products prepared is related to the percent maleation performed. Accordingly, in some oxmal compositions, oxmal compounds may include compounds that have been maleated, for example, on at least one hydrocarbon-based backbone structure, at least two hydrocarbon-based backbone structures, on all hydrocarbon-based backbone structures. In certain embodiments, an oxmal composition may further comprise compounds that have been oxidized but have not been maleated.

In contrast to the prior art, where there apparently has been a concerted effort to use tall oil materials containing primarily, if not almost exclusively, tall oil fatty acids (TOFA) and to conduct the maleation reaction (e.g. the reaction with maleic anhydride and/or fumaric acid, and/or acrylic acid), in a way to promote the formation of the Diels-Alder reaction adduct with linoleic acid (generally by using a catalyst), the present inventors have found that such restrictions are not necessary. In some embodiments according to the invention, the conditions under which the maleation reaction proceeds do not need to be controlled (e.g. a catalyst is not needed) such that the Diels-Alder reaction predominates; there is no need to focus on the production of the Diels-Alder reaction adduct with conjugated fatty acids, such as linoleic acid.

For example, the maleation of a tall oil, such as without limitation a crude tall oil or tall oil distillate or component, proceeds by reaction of the tall oil and, for example, one or more of maleic anhydride, fumaric acid, and (meth)acrylic acid. Once combined, the reaction mixture is heated to a temperature of from about 150° C. to about 250° C. In certain embodiments, the reaction temperature is from about 200° C. to about 230° C. In other embodiments, the reaction temperature is from about 215° C. to about 225° C. In some embodiments, a catalyst can be used. Such catalysts are known in the art.

The maleation reaction is essentially complete after a reaction time from about 5 hours to about 36 hours, and typically from about 20 hours to about 30 hours. Without being bound by theory, the maleic anhydride, fumaric acid, and/or (meth)acrylic acid reacts with the hydrocarbon-based material, at the various sites of unsaturation present in the material. For example, the reaction of maleic anhydride with an unsaturated tall oil fatty acid results in the addition of the anhydride ring to the acid at olefinic sites via the so-called "ene" reaction. The reaction of maleic anhydride with a rosin acid derived from tall oil, at diolefinic sites and with conjugated unsaturated fatty acids, may alternatively form a Diels-Alder addition product having a 6-membered ring with one site of unsaturation. Non-limiting examples of representative reactions that can occur are illustrated in U.S. Pat. No. 4,927,669.

A representative set of structures of molecular species potentially found in maleated tall oil compositions (especially tall oil compositions maleated with maleic anhydride) suitable for use as the starting material for making chemically modified oxidized and maleated unsaturated fatty acid compositions include the Diels-Alder reaction product with conjugated linoleic acid and ene reaction products with oleic and elaidic acids as follows:

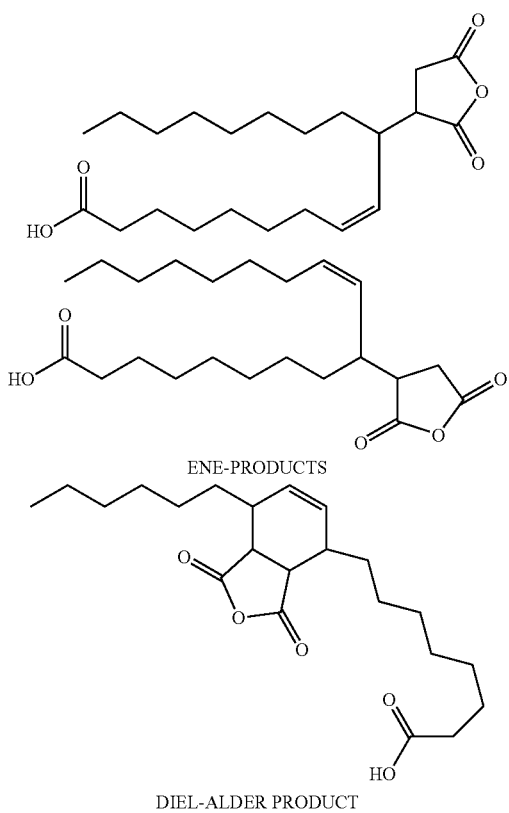

ENE-PRODUCTS

DIEL-ALDER PRODUCT

As will be appreciated by those skilled in the art, certain analogous structures are formed when using any α,β unsaturated carboxylic acid or anhydride for these maleation reactions.

In some embodiments, tall oil distillate components suitable for use in the process of making an oxmal composition include without limitation: fatty acids, tall oil rosin acids, and mixtures of these fractions. The refinement (i.e. fractionation) of tall oil can, for example, provide $C_{16}$-$C_{18}$ saturated and unsaturated fatty acids as well as fatty acid/rosin acid mixtures. In preparing maleated tall oil, such tall oil distillate components, lighter (i.e. lower boiling) or heavier (i.e. higher boiling) components, or components having broader or narrower boiling point ranges may be used in the reaction with an α,β unsaturated carboxylic acid or anhydride. Mixtures or blends of various tall oil distillate fractions may also be employed as the tall oil material. Fatty acid/rosin acid mixtures in a desired ratio may be obtained in a single distillate fraction by adjusting tall oil fractionation conditions. Representative tall oil distillate components include commercially available products XTOL® 100, XTOL® 300, XTOL® 304, and XTOL® 520 (from Georgia-Pacific Chemicals LLC, Atlanta, Ga.).

In one embodiment, for example, a mixture of a first tall oil distillate fraction comprising predominantly tall oil fatty acids (e.g., XTOL® 100) and a second tall oil distillate fraction comprising predominantly rosin acids (e.g., LYTOR® 100) may be blended in a wide range of proportions. In such mixtures, representative amounts of fatty acids and rosin acids range from about 20% to about 99% by weight and from about 1% to about 55% by weight, respectively. Representative weight ratios of the first tall oil distillate fraction to the second tall oil distillate fraction may range from about 3:2 to about 4:1. If such a blend is used to form a maleated tall oil material via reaction with an α,β unsaturated carboxylic acid or anhydride, suitable amounts of the anhydride (or acid(s)) may range from about 2% to about 25% by weight, usually from about 2% to about 15% by weight, based on the combined weight of the tall oil fractions and the anhydride (or acid(s). Depending on the tall oil composition and fractionation conditions, a single tall oil distillate fraction may also suffice to yield a composition that is substantially the same as any of the blends of tall oil distillate fractions discussed above.

In certain embodiments, maleated unsaturated fatty acid compositions suitable for use in making an oxidized and maleated unsaturated fatty acid composition are commercially available. For example, maleated tall oil products can be obtained commercially as XTOL® 690 and XTOL® 692 (from Georgia-Pacific Chemicals LLC, Atlanta, Ga.).

As noted above, the steps of oxidation and maleation of a composition having unsaturated hydrocarbon-based structures can be conducted in either order, as illustrated by the examples which follow. Accordingly, the oxidized and maleated unsaturated fatty acid compositions can be derivatized at any point along the pathway. For example, a composition having unsaturated fatty acids, can first be maleated and then the maleation can be followed by an oxidation. Alternatively, the unsaturated fatty acid composition can first be oxidized and then the oxidized composition can be maleated. In another embodiment, further chemical derivatization can be performed on the completed oxidized and maleated unsaturated fatty acid composition, on the maleated unsaturated fatty acid composition, which can then be oxidized, or on the unsaturated fatty acid composition before any oxidation and or maleation occurs.

III. Oxmal Derivative Compounds and Compositions

Provided herein are chemically modified oxmal compounds and compositions comprising such compounds. In some embodiments, oxmal derivative compounds and compositions include ricinoleic acid modified oxmal compounds and compositions. In some embodiments, oxmal derivative compounds and compositions include polyamine modified oxmal compounds and compositions, including diethylenetriamine, triethylenetetramine, polylysine, Jeffamines®, dipropylenetriamine, triproplyenetetraamine, 1,2-bis(3-aminopropylamino)ethane, bis(hexamethylene)triamine, 1,3-propanediamine, and biogenic polyamines, such as cadaverine, putrascine, spermine, spermidine, histamine, tryptamine, agmatine, cytosine, and serotonin. In some embodiments, oxmal derivative compounds and compositions include amino alcohol modified oxmal compounds and compositions. In some embodiments, oxmal derivative compounds and compositions include imidazoline modified oxmal compounds and compositions. In some embodiments, oxmal derivative compounds and compositions include metal chelator modified oxmal compounds and compositions, including crown ethers, clathrates, phenolics, calixarenes, and cyclodextrin. In some embodiments, oxmal derivative compounds and compositions include ester modified oxmal compounds and compositions. In some embodiments, oxmal derivative compounds and compositions include acetylenic alcohol modified oxmal compounds and compositions. In some embodiments, oxmal derivative compounds and compositions include morpholine modified oxmal compounds and compositions. In some embodiments, oxmal derivative compounds and compositions include phosphate ester modified oxmal compounds and compositions. In some embodiments, oxmal derivative compounds and compositions include amino acid modified oxmal compounds and compositions, including lysine, polylysine, glycine, and cysteine. In some embodiments, oxmal derivative compounds and compositions include xanthate modified oxmal compounds and compositions. In some embodiments, oxmal derivative compounds and compositions include thiophosphate ester modified oxmal compounds and compositions. In some embodiments, oxmal derivative compounds and compositions include hydroxamic acid modified oxmal compounds and compositions. In some embodiments, oxmal derivative compounds and compositions include sulfonate modified oxmal compounds and compositions. In some embodiments, oxmal derivative compounds and compositions include sulfate modified oxmal compounds and compositions.

Further provided herein are methods of chemically modifying oxmal compounds and compositions comprising such compounds, for example, oxidized and maleated tall oil compositions.

A variety of approaches for chemically modifying oxmal compositions are provided. Although the examples and descriptions herein emphasize methods of making compositions, the chemistry is equally applicable to methods of making compounds. As will be appreciated by those skilled in the art from the representative molecules produced by such chemical modifications (as hereinafter illustrated), the oxmal derivative compositions can have a higher carboxylic functionality than industry standard dimer/trimer acids, yet may be produced at a similar molecular weight. Without being bound by theory, this higher carboxylic functionality may enhance the suitability of some embodiments of such compositions for use as reverse flotation mining collectors, formation of salt or soap (relevant to their use as emulsification aides), and also may give certain embodiments of the compositions a stronger film persistency on metal surfaces (relevant for corrosion inhibition applications, for example).

While many different chemical modifications are available to this versatile starting material, in certain embodiments the oxmal derivative compositions prepared as hereinafter described, can contain from about at least 10% by weight to at least about 50% by weight (e.g., at least about 10% by weight, at least about 15% by weight, at least about 20% by weight, at least about 25% by weight, at least about 30% by weight, at least about 35% by weight, at least about 40% by weight, and at least about 50% by weight) of the chemically modified specie(s).

As stated above, an oxmal composition can be derivatized at any point in the process of its production. For example, chemical derivatization can be performed on a completed oxmal composition, on a maleated composition, which can then be oxidized, or on the composition before any oxidation and or maleation occurs. In another embodiment, a chemical derivatization can be performed on an oxidized composition, which can then be maleated, but it is expected that different products will result from the lack non-fatty acid carboxylic moieties present on the oxidized composition during derivatization.

(A) Ricinoleic Acid Modification

In one embodiment, an oxmal composition can be chemically modified with ricinoleic acid. For example, oxidized and maleated TOFA can be chemically modified with ricinoleic acid. Ricinoleic acid is the principal fatty acid constituent in castor oil. Castor oil is a vegetable oil obtained from the castor bean, and contains, in addition to ricinoleic acid, a minor amount of both oleic and linoleic acids (generally less than 5%). Ricinoleic acid is an 18-carbon fatty acid, but unlike oleic and linoleic acids, it has a hydroxyl functional group at the twelfth carbon atom:

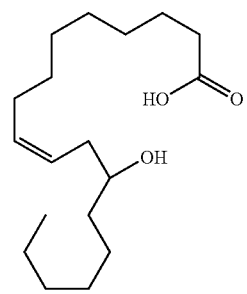

Without being bound by theory, this hydroxyl moiety allows ricinoleic acid to be used to esterify a free carboxyl group on an oxidized and maleated unsaturated fatty acid or rosin acid. Depending on the starting composition used, the relative mole ratios of the starting composition and ricinoleic acid and the reaction conditions utilized, one or more of the free carboxyl groups may be esterified.

For example, conducting the reaction at about a 1:1 mole ratio of ricinoleic acid to a maleic anhydride oxidized and maleated TOFA composition under the reaction conditions identified below, the following non-limiting structures may be prepared:

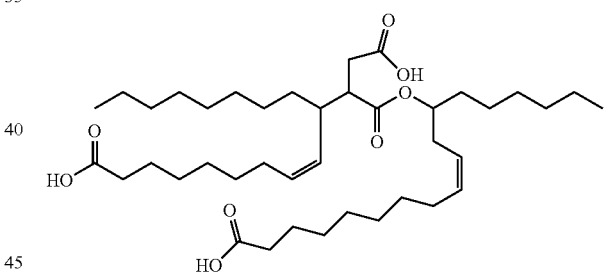

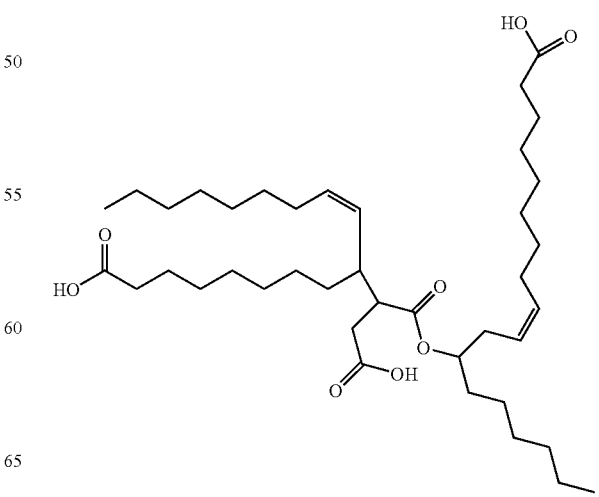

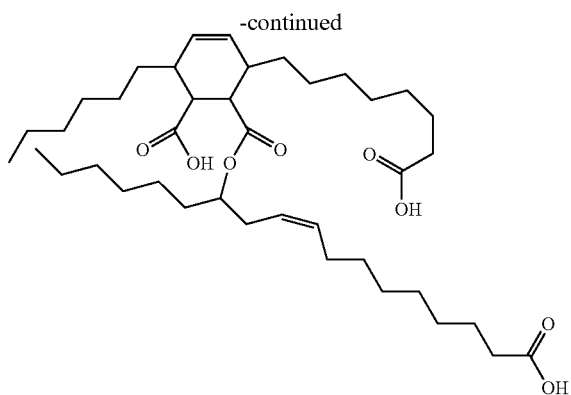

These compounds can then be oxidized to prepare oxmal derivative compounds.

The esterification of the oxmal composition with ricinoleic acid may proceed at a temperature ranging from about 90° C. and up to about 220° C. In certain embodiments, an esterification catalyst can optionally be added to the reaction mixture to promote the esterification reaction. Suitable esterification catalysts are well known in the art. Non-limiting examples of potential catalysts include inorganic acids, such as sulfuric acid, lead acetate, sodium acetate, calcium acetate, zinc acetate, organotin compounds, titanium esters, antimony trioxide, germanium salts, ammonium chloride, sodium hypophosphite, sodium phosphite and organic acids such as methanesulfonic acid and para-toluenesulfonic acid.

In some embodiments, the ricinoleic acid esterification reaction is conducted with a maleic anhydride maleated unsaturated fatty acid composition in the absence of a catalyst and with the temperature limited to a temperature between about 90° C. and about 190° C. Such conditions may selectively promote a reaction between the hydroxyl group of the ricinoleic acid and a carboxyl moiety that has been added to the unsaturated fatty acid via the maleation of the unsaturated fatty acid.

Some of the esterification products have a certain similarity to the chemical structure of dimer/trimer acids currently produced from TOFA and soybean fatty acids and therefore some of the embodiments may be suitable for the same utilities, e.g., as a corrosion inhibitor component in oil field applications. The ricinoleic acid-modified oxmal compositions could provide a suitable alternative to such dimer/trimer acid products for existing requirements and uses. In addition, certain of the esterified oxmal compositions can be used as dispersants in the flotation of fluorspar, magnesite, and phosphates or as co-collectors in the flotation of pyrochlore and fluorspar.

(B) Polyamine Modification

In an alternative embodiment, an oxmal composition can be chemically modified with a polyamine. In certain embodiments, the polyamine can have two or more primary or secondary amine groups. Suitable polyamines include ethylenediamine, diethylenetriamine, triethylenetetramine, tetraethylenepentamine, isophorone diamine, aminoethyl piperazine, piperazine, hydroxyethylethyene diamine, diaminobenzene, lysine, ornithine, xylylenediamine, hexamethylene diamine, bis(hexamethylene)triamine, diaminobenzene sulfonic acid, diaminopropane, diaminocyclohexane, dipropylenetriamine, triproplyenetetraamine, 1,2-bis(3-aminopropylamino)ethane, bis(hexamethylene)triamine, 1,3-propanediamine, and the like. Biogenic polyamines, such as cadaverine, putrascine, spermine, spermidine, histamine, tryptamine, agmatine, cytosine, and serotonin may also be used. Higher molecular weight polyamines such as polylysine, polyornithine, polyallylamine, or Amine HH commercially available from the Dow Chemical Co. also can be used.

Further examples of suitable polyamines are Jeffamine® polyether amines (Huntsman Performance Products, The Woodlands, Tex.). Jeffamine® polyether amines contain primary amino groups attached to the terminus of a polyether backbone. The polyether backbone is based either on propylene oxide (PO), ethylene oxide (EO), or mixed EO/PO. Other Jeffamine® products may contain other backbone segments and may have varied reactivity provided by hindering the primary amine or through secondary amine functionality. Low molecular weight Jeffamines (e.g. JEFFAMINE® D-230) are acceptable, as well as higher molecular weight Jeffamines (e.g. JEFFAMINE® D-2000). In some embodiments, Jeffamine® polyether amine, a medium molecular weight (e.g. JEFFAMINE® D-400), can be used to obtain a desirable viscosity and high temperature stability in the oxmal derivative composition.

In another embodiment, acrylonitrile reduction products may be used. In another embodiment, blends, byproducts, and distillation bottoms of all polyamine species described above may be used to modify an oxidized and maleated unsaturated fatty acid composition.

In one embodiment, (1) the temperature at which the polyamine and oxmal composition reaction is conducted and preferably (2) the relative mole ratio (or more appropriately the equivalent ratio of amine active hydrogens to carboxyl groups) established between the polyamine and the oxmal composition are appropriately set to promote the preparation of the desired amidated oxmal composition. Without being bound by theory, the amine is not simply added to neutralize the fatty acid (a reaction often performed at substantially ambient conditions). Instead, reaction conditions are established (e.g., heat is applied) to promote the formation of a covalent amide bond between the oxmal compound and the polyamine.

For example, the amidation reaction can be conducted (1) at a temperature which is sufficient to cause reaction between the primary and/or secondary amine groups of the polyamine and a carboxyl moiety on an oxmal compound (typically at a temperature above about 50° C.), but (2) at a temperature which is no greater than about 200° C. (e.g., no greater than about 190° C. or no greater than about 160° C.). In one example, a temperature in the range of about 50° C. to about 90° C. can be used for the amidation reaction using a polyamine, when the source of the oxmal composition is a maleic anhydride oxidized and maleated TOFA composition.

Without being bound by theory, controlling the reaction temperature and using a α,β unsaturated carboxylic anhydride oxmal composition can promote a selective reaction between the active hydrogens of the polyamine and a carboxyl moiety that has been added onto the oxmal compound via the maleation of the hydrocarbon-based backbone, while avoiding what may be considered indiscriminate reaction between the active hydrogens of the polyamine and oxmal carboxyl moieties.

As noted earlier, in one embodiment of the invention, the polyamine reaction is conducted with a maleic anhydride oxidized and maleated TOFA composition. In addition, reaction conditions can be controlled to favor the selective amidation of the maleate moiety with primary amines, for example, establishing a mole ratio between the maleic anhydride oxmal composition and the polyamine such that there are at least about 2 and up to about 6 non-fatty acid carboxyl moieties relative to total number of primary amine groups of the polyamine. As shown in Example 14, however, one needs to be judicious when operating with a small excess of non-fatty acid carboxyl moieties in the absence of a significant amount of diluent non-oxidized and maleated fatty acid material, or an undesired level of cross-linking and rapid viscosity build-up may occur.

As was the case with the ricinoleic acid-modified oxmal composition, some of the poly-primary amine modified oxmal compositions may be suitable for the same utilities as conventional dimer/trimer acids, e.g., as corrosion inhibitors in oil field applications.

(C) Amino Alcohol Modification

Another class of chemical modifiers that function in a similar fashion to the polyamines for modifying oxmal compositions are amino alcohols. Examples of primary amine-containing amino alcohols include monoethanolamine, aminoethylethanolamine, diethanolamine, monoisopropanolamine, diisopropanolamine, and the like. As above, the temperature at which the modification reactions are conducted and the mole ratio of the amino alcohol to the oxmal composition can be influential in determining the nature of the modified oxmal product. In one embodiment, an amidation reaction is conducted (1) at a temperature which is sufficient to cause reaction between primary and/or secondary amine groups of the amino alcohol and a non-fatty acid carboxyl moiety (typically a temperature at least about 50° C.), but (2) at a temperature which is no greater than about 200° C. (e.g., no greater than about 190° C. or no greater than about 160° C.). In one example, a temperature in the range of about 50° C. to about 90° C. can be used for the amidation reaction, when the source of oxmal composition is a maleic anhydride maleated and oxidized TOFA composition.

As noted above, without being bound by theory, control of the reaction temperature and using a α,β unsaturated carboxylic anhydride oxmal composition in this way can promote a selective reaction between the amine group of the amino alcohol and a non-fatty acid carboxyl moiety, and to avoid what may be considered indiscriminate reaction between the active hydrogens of the amino alcohol and the fatty acid carboxyl moieties.

In some cases, following the initial amidation reaction, the temperature can be increased to a temperature at least about 90° C. and up to about 220° C., and an esterification catalyst can optionally be added to the reaction mixture to promote reaction between a hydroxyl group of an amino alcohol and another non-fatty acid carboxyl group. Suitable esterification catalysts are well known in the art. Non-limiting examples include inorganic acids, such as sulfuric acid, lead acetate, sodium acetate, calcium acetate, zinc acetate, organotin compounds, titanium esters, antimony trioxide, germanium salts, ammonium chloride, sodium hypophosphite, sodium phosphite and organic acids such as methanesulfonic acid and para-toluenesulfonic acid.

As discussed above, without being bound by theory, conducting the initial amidation reaction in this manner controls the chemistry of the resulting reaction products so that the composition is populated with molecular species that have a molecular weight at least twice that of the starting hydrocarbon-based material with numerous free carboxyl groups.

As was the case with the ricinoleic acid-modified oxmal compositions, these amino alcohol modified oxmal compositions may be suitable for similar utilities as conventional dimer/trimer acids, e.g., as a component of corrosion inhibitors in oil field applications. Amino alcohol modified oxmal compositions thus may provide a suitable alternative for dimer/trimer acids in such applications.

(D) Imidazoline Modification

The present disclosure contemplates the use of fatty imidazoline derivatized oxmal compositions.

These compositions, in one embodiment, can be prepared from fatty imidazoline derivatized tall oil fatty acid (TOFA). The fatty imidazoline derivatized TOFA can be prepared by reacting TOFA with diethylenetriamine at about a 1:1 mole ratio. Typical products of such a reaction have an acid value of about 6-10 and an amine number of 250-300.

In one example, fatty imidazoline derivatized oxmal compositions can be prepared by: (1) preparing the fatty imidazoline, (2) amidating the fatty imidazoline by reaction with a maleated unsaturated fatty acid composition, and (3) oxidizing the resulting composition to prepare the oxmal derivative composition. One embodiment of such a reaction is detailed as follows:

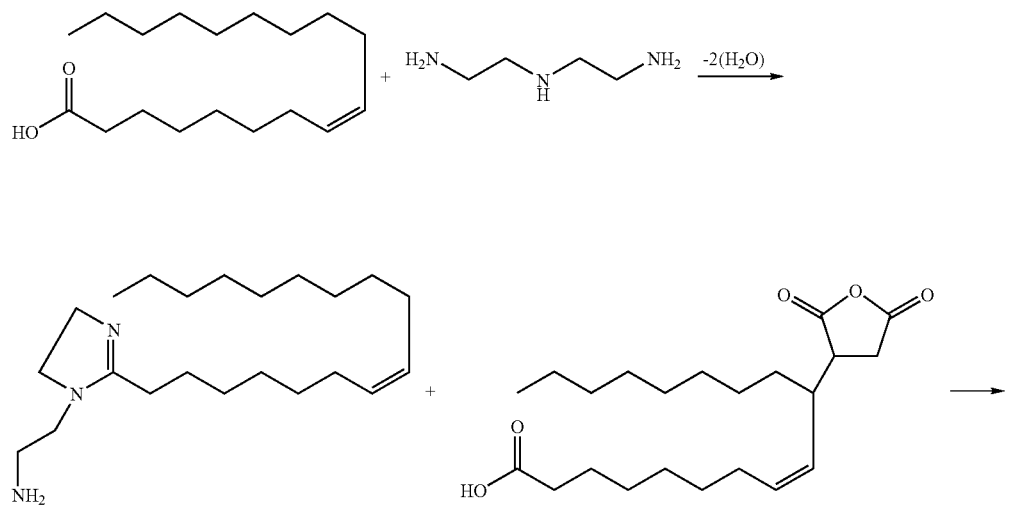

-continued

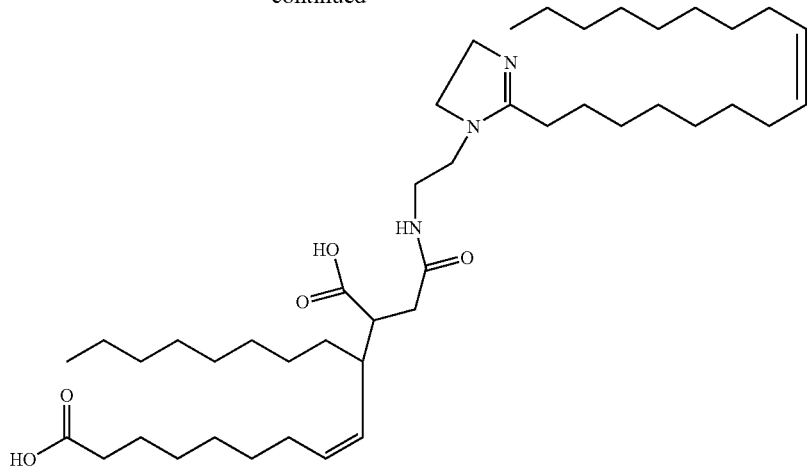

The resulting compounds, detailed above, can then be oxidized to produce an oxmal derivative compound.

Without being bound by theory, as with the use of polyamines and amino alcohols in reactions with oxmal compositions via an amidation reaction, the reaction between the primary amine of the imidazoline and oxmal composition may be conducted at a temperature which is sufficient to cause reaction between the primary amine group of the fatty imidazoline and a non-fatty acid carboxyl moiety of the oxmal composition.

As discussed previously, the amidation reaction can be conducted (1) at a temperature which is sufficient to cause reaction between the primary amine group of the fatty imidazoline and a non-fatty acid carboxyl moiety (typically at a temperature at least about 50° C.), but (2) at a temperature which is no greater than about 200° C. (e.g., no greater than about 190° C. or no greater than about 160° C.). In one example, a temperature in the range of about 50° C. to about 90° C. can be used for the amidation reaction, when the source of the oxmal composition is a maleic anhydride oxidized and maleated TOFA composition.

In some cases, the fatty imidazoline modified oxmal composition can be oil soluble. Such species can provide corrosion inhibitory activity to a variety of oil well-related application including for invert emulsion-type drilling fluids and in the transport and processing of hydrocarbon streams. In addition, certain fatty imidazoline modified oxmal compositions may be useful as corrosion inhibitors in oil field applications. Another application for fatty imidazoline modified oxmal compositions is in the flotation of pyrochlore and as a collector in the reverse flotation of silicates from calcite when the calcite is used as a filler in the plastic industry.

(E) Metal Chelate Modification

Also provided herein are oxmal compositions modified with metal chelators. A metal chelator can be chosen from any cyclic and acyclic organic chelating agent such as diethylene triamine pentaacetic acid (DTPA), 1,4,7,10-tetraazacyclododecane-1,4,7,10-tetraacetic acid (DOTA), 1,4,7-tris(carboxymethyl)-10-(2'-hydroxypropyl)-1,4,7,10-tetraazacyclododecane (HP-DO3A), DOTAGA, 1,4,7-triazacyclonon-one-1,4,7,-triyltriacetic acid (NOTA), Glu-DTPA, DTPA-BMA, ethylenediaminetetraacetic acid (EDTA), polyacrylic acid, polymaleic acid, polycitacenic acid, polyaspartic acid, aspartic acid, crown ethers, clathrates, phenolics, calixarenes, citric acid, and cyclodextrin. In some embodiments, a metal chelator modified oxmal compound or composition can be prepared by providing an amine modified oxmal compound or composition and exhaustively reacting the oxmal derivative compound or composition with chloroacetic acid. Coordination of such species to the carboxyl moieties of the oxmal compositions are known in the art. In some embodiments, condensation of the oxmal composition or compound with a polyamine or a polyol prior to coordination with a metal chelator can facilitate linking of the metal chelator to the oxmal composition or compound. Some embodiments of such modified compositions may be useful in various reverse flotation mining applications as collectors.

(F) Ester Modification

Provided herein are oxmal compositions modified with esters. An ester modified oxmal composition can be prepared by reacting an alcohol with an oxmal composition. In some embodiments, the alcohol is one that is biodegradable, such as an unbranched $C_{5-15}$ alcohol (e.g., a $C_{5-12}$ alcohol). In other embodiments, an ester-modified oxmal composition is prepared by reaction of an oxmal composition with glycerin, partially saponified natural oils, natural oils that are partially transesterified with other alcohols, ethylene glycol, propylene glycol, polyethylene glycols, polypropylene glycols, sugars, 1,3-propanediol, pentaerythritol, trimethylol propane. In certain embodiments, such compositions may be used in further derivatizing reactions. In other embodiments, certain ester-modified oxmal compositions may be used as corrosion inhibitors.

(G) Amino Acid Modification

Also provided herein are amino acid modified oxmal compositions and compounds. In one embodiment, an amino acid modified oxmal composition can be prepared through the reaction of a sarcosine with an oxmal compound or composition. Sarcosines are the condensation product of a fatty acid and the amino acid glycine. In one embodiment, a polysarcosine modified oxmal composition can be made by condensing an oxmal composition with glycine. In another embodiment, a polysarcosine modified oxmal composition can be made by first condensing an unsaturated fatty acid composition with glycine then oxidizing and maleating the modified composition. In some embodiments, further sarcosine functionality can be added by condensing the newly formed carboxylic functionality from the maleation reaction with more glycine. Similar modifications can be made by modifying the oxmal compositions with any natural or unnatural amino acid, for example, tyrosine, lysine, ornithine, arginine, glutamine, glutamic acid, aspartic acid, tryptophane, asparagine, cysteine, cystine, dibromotyrosine, histidine, hydroxylysine, hydroxyproline, isoleucine, leucine, methionine, phenylalanine, alanine, proline, serine, threonine, thyroxine, valine, gamma-aminobutyric acid (GABA), aminobenzoic acid, anthranilic acid, chloroanthranilic acid, amino adipic acid, aminohexanoic acid, aminocaprylic acid, and the like. In other embodiments, polyamino acids and peptides can be used in place of the amino acids. In some embodiments, the amino acid is lysine, polylysine, ornithine, arginine, aspartic acid, or cysteine.

(H) Polyfunctional Corrosion Inhibitors

Further provided herein are polyfunctional corrosion inhibitors prepared by chemically integrating certain known corrosion inhibitors with oxmal compositions using the esterification and/or amidation reactions as previously described. For example, in the case of corrosion inhibitors such as propargyl alcohol and morpholine, one can use the above described esterification and amidation reactions, respectively, to introduce these functional corrosion inhibitors onto oxmal compounds producing enhanced corrosion inhibitors.

(i) Propargyl Alcohol Modification

In one embodiment, by esterifying an oxmal composition with an alkynyl alcohol, such as propargyl alcohol, a triple bond is added to the oxmal compound. This not only creates additional opportunity for further chemical modification of the compound itself, but also creates a new and useful additive for formulating corrosion inhibitors. Propargyl alcohol is a known corrosion inhibitor; accordingly, the ester formed by reacting propargyl alcohol and an oxmal composition (e.g., a maleic anhydride oxidized and maleated TOFA composition) may be particularly useful for corrosion inhibition applications. Non-limiting examples of other materials that can be used in a similar fashion to propargyl alcohol include 1-hexyn-3-ol, 5-decyne-4,7-diol, 2-butyne-1,4-diol, and the oxyalkylated adducts of these acetylenic alcohols, see, e.g., U.S. Pat. No. 3,931,336 and EPA 0 239 770.

(ii) Morpholine Modification

In the case of morpholine, the amidation reaction that occurs between the secondary amine of morpholine and a carboxyl moiety of an oxmal composition can produce an oxmal derivative composition. Some embodiments of the morpholine-modified oxmal compositions may be useful in formulating corrosion inhibitory compositions.

(iii) Phosphate Ester Modification

In another embodiment, an oxmal composition can be modified using phosphate esters. A phosphate ester can be prepared by reacting an ethoxylated alcohol with polyphosphoric acid, or with phosphoric anhydride. In some embodiments, the alcohol is one that is biodegradable and can be made water-soluble by ethoxylation, such as an unbranched $C_{5-15}$ alcohol (e.g., a $C_{5-12}$ alcohol). These materials have a residual hydroxyl group that can be used to chemically integrate the phosphate ester corrosion inhibitors with the oxmal compositions using an esterification reaction. For example, a phosphate ester modified maleated TOFA containing composition could contain:

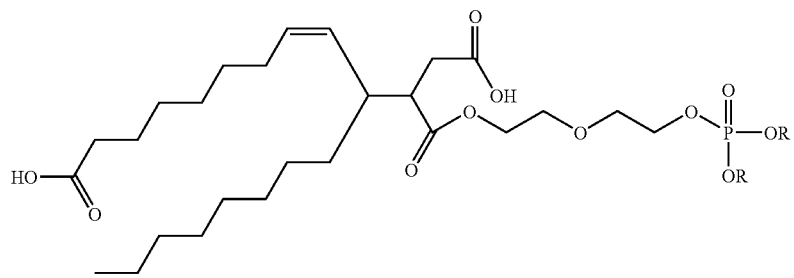

where R can be selected from H, $C_1$-$C_{18}$ alkyls and $C_2$-$C_{18}$ alkenyls. The resulting compound can then be oxidized to provide an oxmal derivative compound.

(I) Reverse Flotation Mining

Figure 2:
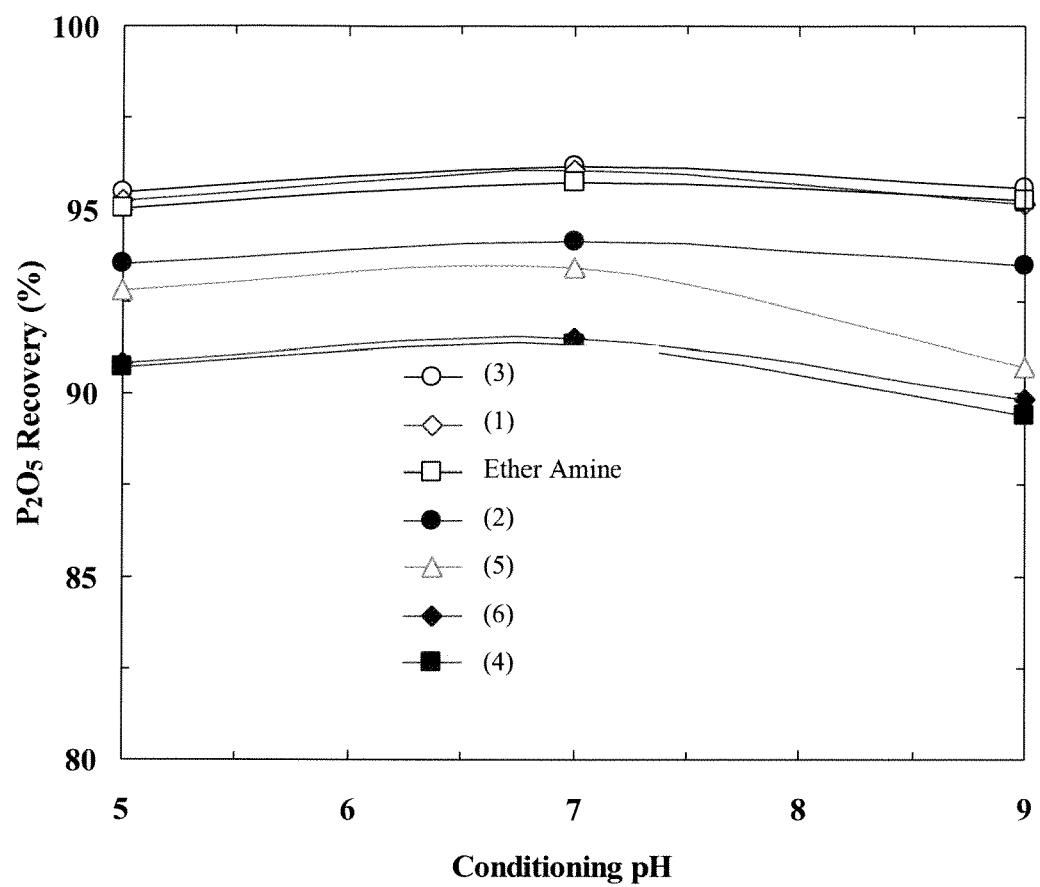
FIG. 2 illustrates the effects of pH and collector type on reverse flotation $P_2O_5$ recovery at a collector dosage of 1.0 lb/ton.
Figure 3:
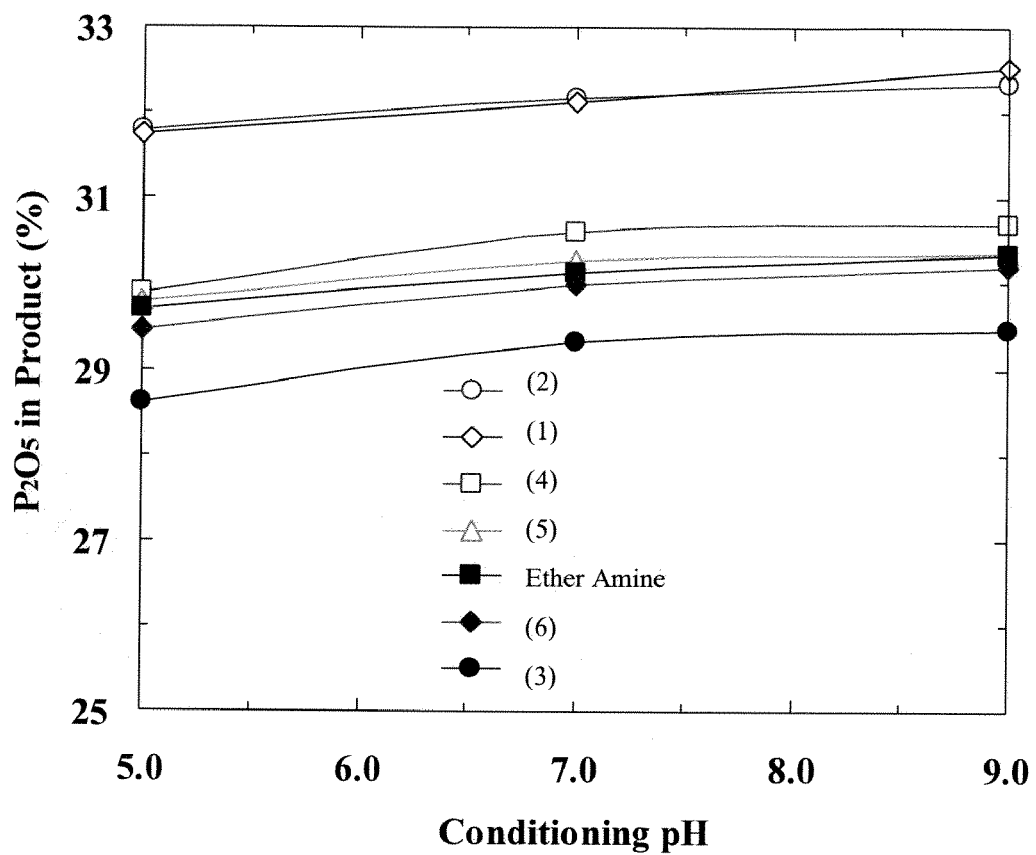
FIG. 3 details the effects of pH and collector type on reverse flotation product $P_2O_5$ grade at a collector dosage of 1.0 lb/ton.

Use of some embodiments of the oxmal derivative compositions described above as reverse flotation mining collectors is also provided. FIGS. 1-3 illustrate the use of oxmal derivative compositions in such an application. In FIGS. 1-3, (1) is a composition of Example 10; (2) is a TOFA amido amine; (3) is a composition of Example 11; (4) is a composition of Example 12; (5) is a modified TOFA amido amine; and (6) is an oxidized TOFA amido amine.

(i) Phosphate Ester Modification

Another potential application for phosphate ester modified oxmal compositions is in reverse flotation mining. Phosphate esters are used commercially for the flotation of iron and titanium containing heavy minerals and biotite from glass sands, in combination with a fatty acid. Without being bound by theory, a phosphate ester of an oxmal compound could have multifunctionality incorporated into the molecule itself, thus improving flotation separation efficiency. In another embodiment, some of the phosphate ester modified oxmal compositions may be used in the flotation of carbonates such as calcite, dolomite, and magnesite when the gangue material is in the silicate form. In another embodiment, certain derivative compositions may also be used in the reverse flotation of phosphorite in combination with a silicate collector such as amido amine derivatives oxidized and maleated unsaturated fatty acid compositions. It is possible to use blends of some of these oxmal derivative compositions with other collectors such as unmodified unsaturated fatty acids and/or maleated and/or oxidized unsaturated fatty acids.

(ii) Xanthate Modification

In a further embodiment, oxmal compositions may be modified with xanthates. Xanthates are prepared by the reaction of carbon disulfide with an alcohol-modified oxmal composition. The alcohol-modified oxmal compositions can be made by esterifying the composition with diol or polyol, for example, pentaerythritol, ethylene glycol, glycerol, polyethylene glycol, propylene glycol, polypropylene glycol, other propanediols, butane diols, pentane diols, and hexane diols.

In some embodiments, a polyxanthate flotation collector can be prepared by first condensing an unsaturated fatty acid composition with a diol or polyol followed by reaction with carbon disulfide. The reaction product can then be oxidized and maleated to produce a chemically modified oxmal composition. In another embodiment, further xanthate functionality can be added by condensing the non-fatty acid carboxyl moieties with additional diol or polyol followed by carbon disulfide reaction. In some embodiments, fatty unsaturated alcohols or oxmal compositions can be used in place of the esterified fatty acids or oxmal compositions as described above. In any case, some embodiments of the resulting polyxanthate collectors may be ideal for copper, platinum, and gold flotation. Similar products called thionocarbamates can be prepared with fatty unsaturated amines or amido amines in place of the esterified fatty acids or oxmal compositions. These collectors may be useful for mining of copper sulfide ores.

(iii) Thiophosphate Ester Modification

In another embodiment, the process detailed for the production of phosphate esters above can be used to prepare thiophosphate esters. In one example, by substituting phosphorus pentasulfide for phosphorus pentoxide, thiophosphate ester modified oxmal compositions can be prepared. Such compositions may have use as co-collectors for sulfide minerals when used with xanthates.

(iv) Hydroxamic Acid Modification

Also provided herein are hydroxamic acid modified oxmal compositions and compounds. Hydroxamic acids are the condensation products of fatty acids and hydroxyl amines. In one embodiment, a polyhydroxamic acid modified oxmal composition can be prepared by condensing an oxmal composition with hydroxylamine. In some embodiments, a polyhydroxamic modified oxmal composition can be made by first condensing an unsaturated fatty acid composition with hydroxylamine followed by oxidizing and maleating the modified unsaturated fatty acid. Further hydroxamic acid functionality can be added by condensing the newly formed carboxylic functionality from the maleation reaction with additional hydroxylamine. Some of the embodiments of modified compositions prepared from hydroxamic acids may be useful as phosphate collectors and as collectors for anatase minerals in the reverse flotation of kaolin clay.

(v) Sulfonate & Sulfate Modification

Sodium alkyl sulfates can be used in the flotation of baryte when it is found together with fluorspar and calcite. They can also be used for the flotation of celestite, gypsum, kainite, anhydrite, and anglesite. For example, sodium dodecyl sulfate has been used as a uranium ore collector. In addition, sulfonates like petroleum sulfonates can be used to float anatase (titaniferrous) to separate it from fine kaolin clay.

The sulfonate modified oxmal compositions can be synthesized by treatment of an oxmal composition with a solution of sodium bisulfite or with fuming sulfuric acid. One example can be prepared by treating glycerol esters of an oxmal composition with chlorosulfonic acid. Some embodiments of sulfonate or sulfate modified oxmal compositions may be more efficient than traditional petroleum sulfonates and alkyl sulfates as flotation collectors, and they are derived from renewable resources like fatty acids instead of from petroleum.

(J) General Considerations

For use in corrosion inhibition and emulsification applications, the oxmal derivative compositions described above can be combined with other materials, in order, for example, to neutralize one or more of the free carboxyl moieties. For example, the oxmal derivative compositions can be neutralized with various organic bases including amines, such as alkylene amines, e.g., diethylenetriamine, imidazoline, amidoamines, amidoamine condensates, and alkanolamines such as monoethanolamine, diethanolamine, triethanolamine, piperazine, hydroxyethylethyene diamine, diaminobenzene, lysine, ornithine, xylylenediamine, hexamethylene diamine, bis(hexamethylene) triamine, diaminobenzene sulfonic acid, diaminopropane, diaminocyclohexane, biogenic polyamines, such as cadaverine, putrascine, spermine, spermidine, histamine, tryptamine, agmatine, cytosine, and serotonin, higher molecular weight polyamines such as polylysine, polyornithine, polyallylamine, or Amine HH, and the like, and alternatively with a variety of inorganic bases to produce the related sodium, potassium and calcium salts of the oxmal derivative compositions as will be recognized by those skilled in the art.

When used in corrosion inhibition applications, in particular, some embodiments of the compositions of the present invention and the related salts thereof can be used in a concentration from about 5 ppm up to about 20 ppm. In other embodiments, the compositions of the present invention and the related salts thereof can be used in an amount from about 1% by weight to about 10% by weight. When used as an emulsifier, generally the oxmal derivative compositions, such as the chemically modified oxidized and maleated tall oil compositions and the related salts thereof, can be used in an amount of from about 2% to about 15% by weight of the emulsion.

Also, the oxmal derivative compositions, as described above, may be dissolved or dispersed in a carrier solvent to facilitate the coating of metals when used as a corrosion inhibiting composition. Suitable carrier solvents include, but are not limited to: water, diesel fuels, alcohols, kerosene, heavy aromatic naphtha, crude oil, and combinations thereof.

In one embodiment, the oxmal derivative compositions, as described above, can be used as corrosion inhibitors in petroleum-recovery applications. In such cases, the downhole conditions in an oil or gas well can vary greatly from one well to the next. For instance, in one environment one may encounter "sweet" conditions (predominately $CO_2$), while in another environment "sour" conditions may predominate ($H_2S$ present). Some embodiments of the oxmal derivative compositions may be suitable for retarding corrosion in both environments.

As noted above, some embodiments of the oxmal derivative compositions are useful in a variety of reverse flotation mining and other related applications. For example, an oxmal derivative composition may be used in froth flotation (and reverse flotation) separation applications (e.g., in ore beneficiation) to enhance the separation of siliceous materials from other non-siliceous materials. For example, the purification of kaolin clay, upgrading the energy value of mined coal, recovering mineral values (e.g., phosphate, potash, lime, sulfate, gypsum, iron, platinum, gold, palladium, titanium, molybdenum, copper, uranium, chromium, tungsten, manganese, magnesium, lead, zinc, silver, graphite, nickel, bauxite, borax, borate and the like) from clay impurities, the separation of bitumen from clay impurities and the like. Depending on the particular circumstances, some embodiments of the oxmal derivative compositions may function as a collector. In some embodiments, certain embodiments of the oxmal derivative compositions may function as emulsifiers in oil sand benefaction.

In addition, some embodiments of the oxmal derivative compositions may also have use in water purification applications where it is necessary to remove solid particulate contaminants (such as by flocculation) or heavy metal ion contaminants (such as by extraction) from water. In all such applications, some embodiments of the oxmal derivative compositions can be added to the aqueous mixtures being treated in an amount of between about 0.005% to about 0.25% by weight.

A method of modifying concrete is further provided, the method comprising adding an effective amount of a concrete admixture to the concrete, wherein the concrete admixture comprises an oxmal derivative composition. As used herein, "modifying" is used to mean altering a characteristic of the concrete, for example, set time, water reduction or flowability, slump, and/or air-entraining. Accordingly, an oxmal derivative composition may function as a retarding admixture, an accelerating admixture, a super plasticizer, a water reducing admixture, and/or an air-entraining admixture. In one embodiment, the oxmal derivative composition is a super plasticizer.

EXAMPLES

General Methods

Acid value was determined using standard methods ASTM D 465-05 and AOCS Te 1a-64. Standard test methods ASTM D 803-03 and AOCS Ja 10-87 (93) were used to measure Brookfield viscosity. Gardner-Holdt viscosity was determined using standard methods ASTM D1545-07 and AOCS Ja 11-87 (93).

Example 1

Oxidation of Maleated Tall Oil Products

Two maleated tall oil products, XTOL® 690 and XTOL® 692, were oxidized using air at an elevated temperature. XTOL® 690 is a tall oil blend of tall oil fatty acid bottoms and a distilled tall oil, which blend has been maleated at a level of about 3.5%. XTOL® 692 is a blend of a tall oil rosin and tall oil fatty acid, which blend has been maleated at a level of about 12%.

Each of these tall oil blends was charged into a reactor which was fitted with an agitator, a thermocouple and a fritted glass sparge stone attached by a hose to an air supply. The tall oil blends were heated to 165° C. and the air turned on and adjusted to a flow rate of 4 L/hr through the sparge stone. The maleated tall oil reaction mixture was then heated to 177° C. and sampled frequently for acid value and viscosity (Gardner-Holdt) as the oxidation reactions proceeded, while holding the reaction mixture at a temperature of 177° C. The reaction mixture was held at a temperature of 177° C. for 10.5-16 hours as air was sparged. The reaction mixture was then cooled to 70-85° C. and discharged. The final physical properties of the maleated and oxidized tall oil product were determined as described above. The properties of the maleated and oxidized tall oil products were measured as shown in the following table with reference to typical properties of the starting materials:

|  | XTOL® 690 | Oxidized XTOL® 690 | XTOL® 692 | Oxidized XTOL® 692 |
| --- | --- | --- | --- | --- |
| Acid Value (mg KOH/g) | 197.3 | 158.7 | 276.0 | 203.9 |
| Brookfield Viscosity (cPs; 25° C.) | 484.9 | 8496 | 1451 | 18010 |

-continued

|  | XTOL® 690 | Oxidized XTOL® 690 | XTOL® 692 | Oxidized XTOL® 692 |
| --- | --- | --- | --- | --- |
| Density (Lbs./gal) | 8.00 | 8.38 | 8.41 | 8.59 |
| Sp. Gravity (25° C.) | 0.961 | 1.006 | 1.010 | 1.031 |

|  |  | Visc | GPC Results | | | | | |
|  |  | (cPs; | UV Detector | | | RI Detector | | |
| Description | AcV | 25° C.) | Mn | Mw | Mz | Mn | Mw | Mz |
| Oxidized XTOL® 692 | 210.4 | 13560 | 654 | 1421 | 2884 | 519 | 844 | 1900 |
| Oxidized XTOL® 690 | 158.7 | 8970 | 800 | 3410 | 9378 | 618 | 1959 | 7330 |

Example 2

Maleation of Oxidized Tall Oil

An oxidized and maleated tall oil composition was produced through the maleation of a commercially available oxidized tall oil product. The oxidized tall oil product, XTOL® MTO, which is an oxidized, high acid value crude tall oil, available commercially from Georgia Pacific was used as the starting material. This oxidized crude tall oil was treated with maleic anhydride.

XTOL® MTO (95 wt %) was charged to a sealed reactor fitted with an agitator, a thermocouple and a condenser. The reactor was heated to 180° C. At 180° C. maleic anhydride (5 wt %) was added slowly to the reactor. The reaction mixture was then heated to 200° C. for approximately 3-6 hours or until all of the maleic anhydride had reacted. The reaction mixture was then cooled to 70-80° C. and discharged. The final physical properties were determined as described above. The properties of the oxidized and maleated tall oil product were measured as shown in the following table with reference to typical properties of the starting materials:

|  | XTOL® MTO | Maleated XTOL® MTO (Oxidized tall oil) |
| --- | --- | --- |
| Acid Value | 143.0 | 163.8 |
| Density (25° C.; Lbs./gal) | 8.25 | 8.52 |
| Sp. Gravity (25° C.) | 0.99 | 1.023 |
| Brookfield Viscosity (cPs: 25° C.) | 4870 | 22580 |

Example 3

Maleation of Crude Tall Oil Followed by Oxidation

A process similar to the one described in Example 1 was used, whereby a crude tall oil mixture was maleated followed by oxidation. In this specific example, the composition was maleated to a level of about 5% and then oxidized.

A crude tall oil (95 wt. %) was charged to a sealed reactor fitted with an agitator, a thermocouple, and a condenser. The reaction mixture was heated to 180° C. At 180° C., maleic anhydride (5 wt. %) was added slowly to the reactor. The reaction mixture was then heated to 200° C. for approximately 3-6 hours or until all of the maleic anhydride had reacted. Once all of the maleic anhydride had reacted, the reaction mixture was then cooled to 180° C. and air was introduced to the reaction mixture using a fritted glass sparge stone attached by a hose to an air supply. The air was turned on and adjusted to a flow rate of 4 L/hr through the sparge stone. Oxidation of the maleated crude tall oil with air was carried out for 12-16 hours. The reaction mixture was then cooled to 70-85° C. and discharged. The final physical properties were determined. The properties of the maleated and oxidized tall oil product were measured as shown in the following table with reference to typical properties of the starting materials:

|  | Crude Tall Oil | Maleated-Oxidized Crude tall oil |
|---|---|---|
| Acid Value | 161.6 | 169.5 |
| Density (25° C.; Lbs/gal) | 8.088 | 8.54 |
| Specific Gravity (25° C.) | 0.9706 | 1.027 |
| Brookfield Viscosity (cPs; 25° C.) | 695.0 | 33800 |

Example 4

Oxidation of Maleated Tall Oil Fatty Acid

In this example, a maleated tall oil fatty acid (TOFA) was oxidized using air at an elevated temperature.

TOFA was charged to a sealed reactor and the contents of the reactor were heated to 70° C. Once a temperature of 70° C. was achieved, maleic anhydride in an amount of about 25% by weight of the overall reaction was added to the vessel. The reactor mixture was then heated to 220° C. in several stages. From the starting temperature of 70° C., the temperature was increased in small increments until 220° C. was achieved. After each temperature adjustment and the desired set point was reached, the material was maintained at the set point temperature for a five minute hold period. The first stage of heating was from 70° C. to 130° C.; the second stage of heating was from 130° C. to 160° C.; the third stage of heating was from 160° C. to 185° C.; the fourth stage of heating was from 185° C. to 205° C.; and the fifth and final stage of heating was from 205° C. to 220° C. The reaction mixture then was held at 220° C. until a Gardner-Holdt viscosity of about Z-2 was reached. This holding period typically required about 5 hours depending on the batch size. The reaction mixture was cooled to a discharge temperature and the physical properties of the maleated product were measured as described above. Typically, the maleated product exhibited an acid number (hydrous) equal to 300-320 mg KOH/g, a specific gravity of 1.04 and a Brookfield Viscosity (at 25° C.) equal to 2700-3400 cps.

To produce a maleated and oxidized fatty acid composition, the maleated tall oil fatty acid was then charged to a reactor which was fitted with an agitator, a thermocouple, and a fritted glass sparge stone attached by a hose to an air supply. The maleated tall oil fatty acid was heated to 165° C. and the air was turned on and adjusted to a flow rate of 4 L/hr through the sparge stone. The reaction mixture was then heated to 177° C. and sampled frequently for acid value and viscosity (Gardner-Holdt) while holding the reaction mixture at 177° C. The reaction mixture was held at 177° C. for 10.5-16 hours as air was sparged. The reaction mixture was then cooled to 70-85° C. and discharged. The final physical properties of the maleated and oxidized TOFA were then determined as described above. The properties of the maleated and oxidized TOFA were measured as:

|  | Oxidized Maleated Tall Oil Fatty Acid |
|---|---|
| Acid Value | 250 |
| Density (25° C.; Lbs./gal) | 8.80 |
| Specific Gravity (25° C.) | 1.056 |
| Brookfield Viscosity (cPs; 25° C.) | 17530 |

|  |  | Visc | GPC Results | | | | | |
|---|---|---|---|---|---|---|---|---|
|  |  | (cPs; | UV Detector | | | RI Detector | | |
| Description | AcV | 25° C.) | Mn | Mw | Mz | Mn | Mw | Mz |
| Oxidized Maleated TOFA | 258.5 | 13560 | 830 | 1503 | 2678 | 654 | 908 | 1603 |
| Oxidized Maleated TOFA | 247.3 | 19328 | 841 | 1535 | 2759 | 644 | 879 | 1548 |

Example 6

Esterifying Maleated Tall Oil Fatty Acid with Ricinoleic Acid Followed by Oxidation To a suitable clean and dry reaction vessel, 56.6% by weight of a maleated TOFA made according to Example 2 is added. The contents of the reactor are heated with agitation and under a nitrogen atmosphere to 110° C. Thereafter, 43.4% by weight of ricinoleic acid is added to the reactor (establishing a ricinoleic acid to TOFA mole ratio of about 1:1) and the contents of the reactor are heated to 150° C. Once all of the ricinoleic acid has been added, the reactor contents are heated further to 180° C. and reacted at this temperature for a time sufficient to stabilize the acid number (i.e., to consume all of the hydroxyl moieties or the ricinoleic acid).

To oxidize the composition, the esterified maleated tall oil fatty acid is charged to a reactor which is fitted with an agitator, a thermocouple, and a fritted glass sparge stone attached by a hose to an air supply. The esterified maleated tall oil fatty acid is heated to 165° C. and the air is turned on and adjusted to a flow rate of 4 L/hr through the sparge stone. The reaction mixture is then heated to 177° C. and sampled frequently for acid value and viscosity (Gardner-Holdt) while holding the reaction mixture at 177° C. The reaction mixture is held at 177° C. for 10.5-16 hours as air is sparged. The reaction mixture is then cooled to 70-85° C. and discharged.

Example 7

Amidating Maleated Tall Oil Fatty Acid with DETA Followed by Oxidation

To a suitable clean and dry reaction vessel, 95.3% by weight of a maleated TOFA made at a fatty acid to maleic anhydride mole ratio of 2:1 is added.

The maleated TOFA is prepared as follows. To a suitable clean and dry reaction vessel 85.9% by weight of TOFA is added. The contents of the reactor are heated with agitation and under a nitrogen atmosphere to 70° C. Thereafter, 14.1% by weight of maleic anhydride (MA) is added to the reactor (establishing a TOFA to MA mole ratio of 2:1) and the contents of the reactor are heated. From the starting temperature of about 70° C.; the temperature is incrementally increased until 220° C. is achieved. After each temperature adjustment and the desired set point is reached, the material is maintained at the set point temperature for a short hold period. The first stage of heating is from 70° C. to 130° C.; the second stage of heating is from 130° C. to 160° C.; the third stage of heating is from 160° C. to 180° C.; the fourth stage of heating is from 180° C. to 200° C.; and the fifth and final stage of heating is from 200° C. to 220° C. The reaction mixture then is held at 220° C. until a desired viscosity is reached. This holding period typically takes about 4-5 hours depending on the batch size. The reaction mixture is cooled to a discharge temperature.

The maleated TOFA then is heated with agitation and under a nitrogen atmosphere to 120° C. Thereafter, 4.7% by weight of diethylenetriamine (DETA) is added to the reactor (establishing a DETA to TOFA mole ratio of about 1:2) and the contents of the reactor are heated to 180° C. The reactor contents are reacted at this temperature for about 2 hours.

To oxidize the composition, the DETA modified TOFA composition is charged to a reactor which is fitted with an agitator, a thermocouple, and a fritted glass sparge stone attached by a hose to an air supply. The maleated tall oil fatty acid is heated to 165° C. and the air is turned on and adjusted to a flow rate of 4 L/hr through the sparge stone. The reaction mixture is then heated to 177° C. and sampled frequently for acid value and viscosity (Gardner-Holdt) while holding the reaction mixture at 177° C. The reaction mixture is held at 177° C. for 10.5-16 hours as air is sparged. The reaction mixture is then cooled to 70-85° C. and discharged.

Example 8

Imidazoline Modified Oxidized and Maleated Tall Oil Fatty Acid

To a suitable clean and dry reaction vessel, 1474 parts by weight of a tall oil fatty acid are added. The contents of the reactor are heated with agitation and under a nitrogen atmosphere to about 60-70° C. Then, the addition of about 526 parts by weight of diethylenetriamine (DETA) is initiated. The addition rate is controlled to allow the reactor contents to exotherm to about 100° C. and then heat is applied to raise the temperature to about 115° C. Once all of the DETA has been added (occurs over a period of about 3.5 hours), the reactor contents are heated to 160° C. and reacted at this temperature for a time sufficient to achieve a constant acid value, which can require about 3.25 hours.

To a suitable clean and dry reaction vessel, 52.1% by weight of a maleated TOFA is added. The contents of the reactor are heated with agitation under a nitrogen atmosphere to about 140° C. As additional heat is applied, 47.9% by weight of the above-produced fatty imidazoline is quickly added to the reactor. The reaction mixture is heated first to 160° C. as the fatty imidazoline is added and then to 180° C., once all of the fatty imidazoline has been added. After a reaction time of about 1.5 hours, measured from when the fatty imidazoline addition was started, an imidazoline-modified maleic anhydride maleated TOFA is recovered.

To oxidize the imidazoline-modified maleic anhydride maleated TOFA composition, the composition is charged to a reactor which is fitted with an agitator, a thermocouple, and a fritted glass sparge stone attached by a hose to an air supply. The maleated tall oil fatty acid is heated to 165° C. and the air is turned on and adjusted to a flow rate of 4 L/hr through the sparge stone. The reaction mixture is then heated to 177° C. and sampled frequently for acid value and viscosity (Gardner-Holdt) while holding the reaction mixture at 177° C. The reaction mixture is held at 177° C. for 10.5-16 hours as air is sparged. The reaction mixture is then cooled to 70-85° C. and discharged.

Example 9

Diethylenetriamine Derivative of Oxidized and Maleated TOFA

To a 1 liter round-bottomed flask fitted with a Barrett trap, condenser, thermocouple, nitrogen inlet adaptor and an agitator was added 394.1 grams of an oxidized and maleated TOFA having an acid value of 201.4. The reactor was heated to 100° C. Once the reactor reached 100° C., diethylenetriamine was slowly added to the flask over a 40 minute period. When the diethylenetriamine addition was complete, the reaction mixture was heated to 160° C. and held for 7 hours until the acid value was 5.75. The reaction mixture was then cooled to 100° C. and discharged. The physical properties of the product were as follows: acid value=5.75; Brookfield viscosity=14000 cPs (25° C.); % solids=97.5; Density (25° C.)=8.314 lbs/gal; Sp. Grav. (25° C.)=0.999.

Example 10

Diethylenetriamine Derivative of Maleated MTO

To a 1 liter round-bottomed flask fitted with a Barrett trap, condenser, thermocouple, nitrogen inlet adaptor and an agitator was added 411.4 grams of maleated MTO with an acid value of 158.9. The reactor was heated to 100° C. Once the reactor reached 100° C., diethylenetriamine was slowly added to the flask over a 40 minute period. When the diethylenetriamine addition was complete, the reaction mixture was heated to 160° C. and held for 16 hours until the acid value was 41.5. The reaction mixture was then cooled to 100° C. and discharged. The physical properties of the product were as follows: acid value=41.5; Brookfield viscosity=46,330 cPs (25° C.); % solids=89.4; Density (25° C.)=8.505 lbs/gal; Sp. Grav. (25° C.)=1.022.

Example 11

Diethylenetriamine Derivative of Oxidized XTOL® 692

To a 1 liter round-bottomed flask fitted with a Barrett trap, condenser, thermocouple, nitrogen inlet adaptor and an agitator was added 304.8 grams of XTOL® 692 with an acid value of 258.1. The reactor was then heated to 100° C. Once the reactor reached 100° C., diethylenetriamine was slowly added to the flask over a 40 minute period. When the diethylenetriamine addition was complete, the reaction mixture was heated to 160° C. and held for 16 hours until the acid value was 30.7. The reaction mixture was then cooled to 100° C. and discharged. The physical properties of the product were as follows: acid value=30.7; Brookfield viscosity=26,770 cPs (25° C.); % solids=98.7; Density (25° C.)=8.606 lbs/gal; Sp. Grav. (25° C.)=1.034.

Example 12

Oxidized and Maleated Fatty Amido Amine as Collectors in the Reverse Flotation of Phosphate Ore This example addresses Reverse Flotation using the cationic collector. The following compositions along with a proprietary commercial reagent were evaluated:
(1) the composition of Example 9;
(2) a TOFA amido amine;

(3) the composition of Example 10;
(4) the composition of Example 11;
(5) a modified TOFA amido amine; and
(6) an oxidized TOFA amido amine.

The effects of pH and collector type on reverse phosphate flotation performance were studied by flotation tests at three pH levels (5.0, 7.0, and 9.0) with six reagents along with a proprietary commercial fatty ether amine. FIGS. 1-3 show the effects of pH on phosphate flotation separation efficiency, $P_2O_5$ recovery and product $P_2O_5$ grade, respectively, at varying pHs from 5.0 to 9.0. The figures indicate that (1) showed better flotation performance than any of the other collectors including the proprietary commercial fatty ether amine. The highest $P_2O_5$ recovery was achieved at the pH of 7.0 for all the collectors. The optimum phosphate flotation separation efficiency, $P_2O_5$ recovery and $P_2O_5$ grade with (1) were 92.0%, 96.1% and 32.1%, respectively. Compared with the ether amine, the use of collector (1) increased separation efficiency and $P_2O_5$ recovery by 0.7% and 4.7%, respectively, at the pH value of 7.0.

Example 13

Use of an Oxidized and Maleated TOFA Composition as a Concrete Admixture

The efficacy of using the cationic salts of selected amidoamine derivatives of oxmal compositions was examined. The derivatives were prepared from diethylenetriamine (DETA) as described in previous examples. They were then neutralized with acid (HCl) to prepare the cationic salts and diluted to a final concentration of 30-40% with water. Each sample was then tested using a modified "mini-slump" test (Kantro, D. L., *Cement, Concrete and Aggregates*, Winter 1980, Vol. 2(2): 95).

In a large paper cup (20 oz.) Portland Cement (300 g, Type I/II), water (120 g), and the additive to be tested (weight varied based on concentration) were combined. The combination was hand mixed with a wooden tongue depressor for 2 minutes, allowed to stand for 3 minutes, mixed an additional 1 minute and then tested. An amount of the test mixture sufficient to completely fill the test vessel was poured into a 150-mL capacity waxed paper cup modified with a ⅛ inch diameter hole in the bottom. While plugging the hole in the bottom with a finger, the cup was inverted onto a smooth, flat surface. The cup was then removed and the cement pat was allowed to settle (slump) for 1 minute. The diameter of the resulting pat was measured and the area calculated. The larger the area, the more effective the additive at increasing flowability of the cement. The results obtained from the various compositions tested are shown below in the table.

| Additive | Concentration (%) | Amount (g) | Average Diameter (mm) | Calculated Area (cm$^2$) |
|---|---|---|---|---|
| None | — | — | 92 | 66 |
| None | — | — | 90 | 64 |
| None | — | — | 89 | 62 |
| Water | 100 | 2.0 | 91.3 | 66 |
| DETA/TOFA derivative | 37.5 | 1.66 | 67 | 35 |
| DETA/oxidized TOFA derivative | 37.0 | 1.7 | 71 | 39 |
| DETA/maleated TOFA derivative | 33.8 | 1.8 | 99.3 | 77 |
| DETA/oxidized XTOL ® 692 derivative | 30.9 | 2.0 | 98 | 75 |
| DETA/oxidized and maleated TOFA derivative | 31.0 | 2.0 | 96 | 72 |
| DETA/maleated XTOL ® MTO derivative | 32.4 | 1.9 | 120 | 114 |

A number of embodiments have been described. Nevertheless, it will be understood that various modifications may be made without departing from the spirit and scope of the invention. Accordingly, other embodiments are within the scope of the following claims.

What is claimed is:

1. A composition comprising: an oxidized and maleated fatty acid or rosin acid compound, wherein the composition comprises fatty acid compounds, rosin acid compounds or a mixture of such compounds having crosslinks between hydrocarbon chains through an ether linkage and having one or more derivatized carboxylic acid moieties.

2. A composition according to claim 1, wherein the one or more derivatized carboxylic acid moieties is a carboxylic acid reacted with one or more of ricinoleic acid, a polyamine, an amino alcohol, an imidazoline, a metal chelator, an acetylenic alcohol, morpholino, a phosphate ester, an amino acid, a xanthate, a thiphosphate ester, a hydroxamic acid, a sulfonate, and a sulfate.

3. A composition according to claim 2, wherein polyamines are chosen from:
ethylenediamine, diethylenetriamine, triethylenetetramine, tetraethylenepentamine, isophorone diamine, aminoethyl piperazine, piperazine, hydroxyethylethyene diamine, diaminobenzene, lysine, ornithine, xylylenediamine, hexamethylene diamine, bis(hexamethylene)triamine, diaminobenzene sulfonic acid, diaminopropane, diaminocyclohexane, polylysine, polyornithine, polyallylamine, Amine HH, Jeffamines, dipropylenetriamine, triproplyenetetraamine, 1,2-bis(3-aminopropylamino)ethane, bis(hexamethylene)triamine, 1,3-propanediamine, cadaverine, putrascine, spermine, spermidine, histamine, tryptamine, agmatine, cytosine, and serotonin.

4. A composition according to claim 2, wherein amino alcohols are chosen from: monoethanolamine, am inoethylethanolamine, diethanolamine, monoisopropanolamine, and diisopropanolamine.

5. A composition according to claim 2, wherein amino acids are chosen from natural and unnatural amino acids.

6. A method of emulsifying a solution comprising combining the solution with an effective amount of a composition according to claim 1.

7. A method of inhibiting corrosion on a metal surface comprising contacting the metal surface with an effective amount of a composition according to claim 1.

8. A method of reducing corrosion on a metal surface comprising contacting the metal surface with an effective amount of a composition according to claim 1.

9. A method of floating an ore, the method comprising introduction of a composition comprising an ore collector to a reverse flotation cell, wherein the composition comprises an effective amount of a composition according to claim 1, 10. A method of modifying concrete, the method comprising adding a concrete admixture to the concrete, wherein the concrete admixture comprises a composition according to claim 1.

* * * * *